United States Patent
Raslambekov

(10) Patent No.: US 10,849,717 B2
(45) Date of Patent: Dec. 1, 2020

(54) SYSTEMS AND METHODS FOR MAKING AN ORTHODONTIC ALIGNER

(71) Applicant: 3D MED AG, St. Moritz (CH)

(72) Inventor: Islam Khasanovich Raslambekov, Moscow (RU)

(73) Assignee: 3D MED AG, St. Moritz (CH)

( * ) Notice: Subject to any disclaimer, the term of this patent is extended or adjusted under 35 U.S.C. 154(b) by 0 days.

(21) Appl. No.: 16/373,723

(22) Filed: Apr. 3, 2019

(65) Prior Publication Data
US 2020/0315743 A1  Oct. 8, 2020

(51) Int. Cl.
*A61C 7/00* (2006.01)
*A61C 9/00* (2006.01)
*A61C 13/00* (2006.01)
*G06F 30/00* (2020.01)

(52) U.S. Cl.
CPC ............ *A61C 7/002* (2013.01); *A61C 9/0046* (2013.01); *A61C 13/0004* (2013.01); *G06F 30/00* (2020.01); *G06T 2210/41* (2013.01)

(58) Field of Classification Search
CPC ... A61C 7/002; A61C 9/0046; A61C 13/0004; G06F 17/50; G06T 2210/41
See application file for complete search history.

(56) References Cited

U.S. PATENT DOCUMENTS

| | | | |
|---|---|---|---|
| 5,447,432 A | 9/1995 | Andreiko et al. | |
| 7,147,466 B1 | 12/2006 | Hilliard et al. | |
| 9,144,472 B2 | 9/2015 | Isaacson et al. | |
| 9,286,417 B2 | 3/2016 | Manzer et al. | |
| 9,848,958 B2 | 12/2017 | Matov et al. | |
| 2008/0254402 A1* | 10/2008 | Hilliard .............. | G05B 19/4097 433/24 |
| 2017/0007359 A1 | 1/2017 | Kopelman et al. | |
| 2017/0007360 A1 | 1/2017 | Kopelman et al. | |
| 2017/0007363 A1 | 1/2017 | Boronkay | |
| 2017/0007365 A1 | 1/2017 | Kopelman et al. | |

(Continued)

FOREIGN PATENT DOCUMENTS

| EP | 2932935 A1 | 10/2015 |
|---|---|---|
| WO | 2018118200 A1 | 6/2018 |

OTHER PUBLICATIONS

European Search Report dated Sep. 23, 2019 issued in connection with the related European Patent Application 19167161.9.

*Primary Examiner* — Rehana Perveen
*Assistant Examiner* — Steven W Crabb
(74) *Attorney, Agent, or Firm* — BCF LLP

(57) ABSTRACT

A method and system for making an orthodontic aligner, as well as an orthodontic aligner. The method comprising: determining at least one super contact region between upper teeth and lower teeth of a subject, the super contact region comprising identifying an area around an at least one contact region between the upper teeth and the lower teeth which exceeds a predetermined magnitude of contact between the upper and lower teeth during a predefined upper/lower teeth position; and generating a digital model of the aligner comprising applying the determined super contact region to a digital model of a pre-form aligner such that a thickness of the aligner body at the determined super contact region is less than a thickness of the aligner body at regions which are not determined super contact regions.

13 Claims, 14 Drawing Sheets
(10 of 14 Drawing Sheet(s) Filed in Color)

(56) References Cited

U.S. PATENT DOCUMENTS

| | | |
|---|---|---|
| 2017/0100214 A1* | 4/2017 | Wen ........................ A61C 7/002 |
| 2018/0116762 A1 | 5/2018 | Kopelman |
| 2018/0185125 A1 | 7/2018 | Salah et al. |
| 2019/0000592 A1* | 1/2019 | Cam ..................... A61C 9/0046 |

* cited by examiner

SYSTEMS AND METHODS FOR MAKING AN ORTHODONTIC ALIGNER

FIELD

The present technology relates to orthodontic aligners, and systems and methods for making orthodontic aligners.

BACKGROUND

In orthodontics, treatments for achieving alignment of malposed teeth in a subject include applying orthodontic appliances, such as orthodontic aligners, to the subject's teeth. Orthodontic aligners are typically worn over the teeth of the top and/or bottom archforms in order to exert a force to the teeth to align malocclusions or to retain teeth positions. Aligners are typically custom-made to the subject's teeth and designed to exert the desired force in the desired position to correct the malocclusions. Although they are removeable, aligners are typically arranged to be worn for extended periods during the day and/or night, typically 22 hours. There may be a number of consecutive treatment steps using different aligners which apply different pressures. Generally, the earlier treatment steps apply more gentle forces compared to the later treatment steps.

It is an object of the present technology to ameliorate at least some of the inconveniences present in the prior art.

SUMMARY

Embodiments of the present technology have been developed based on developers' appreciation of certain shortcomings associated with existing orthodontic aligners and orthodontic aligner treatments.

Embodiments of the present technology have been developed based on the developers' observation that discomfort to the subject caused by the aligners can lead to ineffective or prolonged treatment due to the subject not adhering to the treatment.

In cases where a subject has an upper and lower aligner, both the upper and the lower archforms will be encased by the aligner material. This can lead to discomfort to the subject leading to deviations from the treatment protocol.

Furthermore, developers have noted that over time, aligners can force the jaw apart leading to potentially long lasting negative effects due to the occlusive effect of the aligner material between contacting surfaces of the upper and lower archforms. For example, for an aligner with a typical thickness of 0.75 mm, when a subject wears upper and lower aligners, there can be a separation of 1.5 mm between contact surfaces of the teeth. Upper and lower teeth usually contact one another at the molar region. However, when a subject chews, relative movement between the upper and lower teeth is not strictly vertical but tends to move in a circular motion. With a separation of 1.5 mm at the molar region of the teeth, the separation between oppositely facing teeth at the front region of the mouth (e.g. the canine and incisor teeth area) can reach 3 mm.

Furthermore, aligner thickness may vary in different treatment steps, increasing up to as much as 1 mm.

This upper and lower teeth disocclusion is not only uncomfortable to the subject but can lead to overstretching of the ligaments of the temporomandibular joint. Additionally, the disocclusion can also lead to speech impairment.

Thinning of aligner material for comfort and reducing temporomandibular joint issues has been proposed in US2017/0007359 and US2018/0116762 with no additional disclosure as to how it is determined let alone optimized.

According to broad aspects and embodiments of the present technology, there are provided orthodontic aligners, and methods and systems of making the orthodontic aligners which at least partially alleviate or solve the abovementioned problems. In certain aspects, thinning or elimination of aligner body material is provided at regions determined to be super contact regions between the subject's teeth. Unlike prior art systems, such super contact regions are determined according to a force or a depth of penetration analysis in certain embodiments. In certain embodiments, such orthodontic aligners with thinned super contact regions provide increased comfort to the subject wearing them, increased treatment adherence, and minimization or avoidance of temporomandibular joint problems.

According to one aspect, there is provided a method for making an orthodontic aligner comprising an aligner body defining a channel for receiving teeth of a lower archform or an upper archform of a subject, the method being implemented by a processor of a computer system, the method comprising: determining, by the processor, at least one super contact region between upper teeth and lower teeth of a subject, the determining the at least one super contact region comprising identifying an area around at least one contact region between the upper teeth and the lower teeth which exceeds a predetermined magnitude of contact between the upper teeth and the lower teeth during a predefined position of the upper teeth and the lower teeth of the subject; and generating a digital model of the orthodontic aligner for making the orthodontic aligner, the generating the digital model of the orthodontic aligner comprising applying the determined super contact region to a digital model of a pre-form aligner such that a thickness of the aligner body at the determined at least one super contact region is less than a thickness of the aligner body at regions which are not determined super contact regions. In certain embodiments, the regions which are not determined super contact regions are adjacent portions on the aligner body. In certain embodiments, the regions which are not determined super contact regions are contact regions.

In certain embodiments, the determining the at least one contact region comprises: obtaining an image of the upper archform and the lower archform of a subject's teeth, the image comprising a three-dimensional representation of one or more of the upper teeth of the subject and the lower teeth of the subject; generating a contact region model (e.g. a digital model) of the upper teeth and the lower teeth; identifying a contact surface (e.g. an outer surface) on at least one or both of the upper teeth and the lower teeth in the contact region model; determining an extended contact surface (e.g. an extended outer surface) on the at least one or both of the upper teeth and the lower teeth in the contact region model, the extended contact surface being spaced from the contact surface by a predetermined distance; determining as the at least one contact region, when the upper teeth and the lower teeth of the contact region model are aligned in a predefined bite configuration, those areas which hinder the predefined bite configuration of the upper and lower teeth, based on: opposing extended contact surfaces of the upper teeth and the lower teeth of the contact region model, or the extended contact surface of one of the upper teeth and the lower teeth of the contact region model, and the contact surface of the other of the upper teeth and the lower teeth of the contact region model.

In certain embodiments, determining the at least one super contact region comprises defining a boundary of the super contact region about the at least one contact region.

In certain embodiments, determining the at least one super contact region comprises mapping the contact between the upper teeth and the lower teeth during a predefined position of the upper teeth and the lower teeth of the subject, before identifying the area which exceeds the predetermined magnitude of contact within the mapped extent of the contact.

In certain embodiments, the predetermined magnitude of contact comprises a depth of overlap between opposing extended contact surfaces of the upper teeth and the lower teeth in the contact region model.

In certain embodiments, the predetermined magnitude of contact comprises one or more of: a force imparted by the contact of the upper teeth and the lower teeth during a predefined position or action of the upper teeth and the lower teeth, and an extent of compression of a predefined material applied between the upper teeth and the lower teeth during a predefined position or action of the upper teeth and the lower teeth.

In certain embodiments, the determined super contact region is applied as a cut-out or a thinned portion to the digital model of the pre-form aligner. The digital model of the pre-form aligner may be based on one or more of the upper archform image and the lower archform image.

In certain embodiments, the digital model of the orthodontic aligner includes a profile of an edge of the channel of the aligner, the method further comprising determining the profile of the edge of the channel such that the determined profile of the edge of the channel tracks a gum line of the subject.

In certain embodiments, the determining the profile of the edge of the channel comprises parsing images, or digital models, of one or both of: the lower archform, and the upper archform, to identify the profile of the gum line of the subject.

In certain embodiments, the profile of the gum line is determined based on a determination of a curvature of the surface of the crown, and applying an active contour modelling.

In certain embodiments, the method further comprises parsing images, or digital models, of one or more of the upper archform and the lower archform to separate the tooth crown from the gums according to the determined gum line, and creating a new digital model of gums based on adaptive regions in the template.

In certain embodiments, the method further comprises one of: (i) sending instructions to a manufacturing apparatus to make the orthodontic aligner according to the digital model of the orthodontic aligner, wherein the instructions comprise instructions for applying a cut-out or thinned material to a pre-form aligner at the determined super contact region; and (ii) sending instructions to a manufacturing apparatus to make the orthodontic aligner according to the digital model of the orthodontic aligner, wherein the instructions comprise instructions for forming the aligner including cut-outs or thinned portions at the determined super contact region.

In certain embodiments, the instructions comprise instructions for cutting a pre-form aligner along one or both of: a determined boundary of the determined super contact region according to the determined digital model of the orthodontic aligner; and a determined profile of the edge of the channel according to the determined digital model of the orthodontic aligner.

According to another aspect, there is provided a system for making an orthodontic aligner comprising an aligner body defining a channel for receiving teeth of a lower archform or an upper archform of a subject, the system comprising: a computer system having a processor for executing a method for making an orthodontic aligner according to a determined digital model; and a manufacturing apparatus operatively connectable with the processor and arranged to make the aligner according to the determined digital model, the method comprising: determining at least one super contact region between upper teeth and lower teeth of a subject, the super contact region comprising identifying an area around an at least one contact region between the upper teeth and the lower teeth which exceeds a predetermined magnitude of contact between the upper teeth and the lower teeth during a predefined position of the upper teeth and the lower teeth of the subject; and generating the digital model of the orthodontic aligner for making the orthodontic aligner by applying the determined super contact region to a digital model of a pre-form aligner such that a thickness of the aligner body at the determined at least one super contact region is less than a thickness of the aligner body at regions which are not determined super contact regions. The super contact region may be an opening formed in the aligner body. The super contact region may be a thinned portion in the aligner body. Combinations of openings and thinned portions may be provided in an aligner.

In certain embodiments, the manufacturing apparatus comprises a laser apparatus for cutting a pre-form orthodontic aligner along one or more of: a boundary of the determined super contact region, and a determined profile of the edge of the channel.

In certain embodiments, the manufacturing apparatus comprises an apparatus for making the pre-form orthodontic aligner, or an apparatus for making a mould for making the pre-form orthodontic aligner.

From another aspect, there is provided an orthodontic aligner comprising an aligner body defining a channel for receiving teeth of a lower archform or an upper archform of a subject, the aligner comprising at least one super contact region, a thickness of the aligner body at the at least one super contact region being less than a thickness of the aligner body in areas which are not super contact regions, wherein the super contact region is an area of contact between the upper teeth and the lower teeth which exceeds a predetermined magnitude of contact between the upper teeth and the lower teeth during a predefined position of the upper teeth and the lower teeth of the subject.

In certain embodiments, the predetermined magnitude of contact comprises one or more of: a force imparted by the contact of the upper teeth and the lower teeth during a predefined position or action of the upper teeth and the lower teeth, an extent of compression of a predefined material applied between the upper teeth and the lower teeth during a predefined position or action of the upper teeth and the lower teeth; a depth of overlap between opposing extended contact surfaces of the upper teeth and the lower teeth in the contact region model.

In certain embodiments, the super contact region is an opening defined in the aligner body of the orthodontic aligner. In certain embodiments, the super contact region comprises a thinned portion of the aligner body.

In certain embodiments, the edge of the channel has a profile that tracks a gum line of the subject.

In certain embodiments, the edge of the channel is fused by a laser beam.

From a yet further aspect, there is provided a set of orthodontic aligners. The set comprises an upper orthodontic aligner comprising an upper aligner body defining a channel for receiving teeth of an upper archform of a subject, and a lower orthodontic aligner comprising a lower aligner body defining a channel for receiving teeth of a lower archform of a subject, at least one super contact region on the upper orthodontic aligner and the lower orthodontic aligner which is an area of contact between the upper orthodontic aligner and the lower orthodontic aligner which exceeds a predetermined magnitude of contact during a predefined position of the upper teeth and the lower teeth of the subject, wherein a thickness of the upper aligner body and the lower aligner body at the at least one super contact region is less than a thickness of the upper aligner body or the lower aligner body in areas which are not super contact regions. In certain embodiments, the upper orthodontic aligner and the lower orthodontic aligner have contact surfaces with interposed aligner body material therebetween, wherein a thickness of the interposed aligner body material at the super contact region is less than a thickness of the interposed aligned body material at contact areas which are not super contact regions.

Furthermore, developers have noted that the success of aligner-based treatment on aligning teeth or retaining teeth positions is based partially on the series of treatment steps and the optimization of forces applied during each step. Currently, the aligner treatment steps tend to be based on the clinician's experience and judgment. This means that outcomes between clinicians are variable. A further confounding factor is that the actual behaviour of the teeth may be very different from what the clinician has planned (i.e. the desired result and orientation of the teeth that the orthodontic treatment is supposed to render).

In certain embodiments, the method further comprises steps for determining an orthodontic treatment having a number of sequential treatment steps with the aligner, the sequential treatment steps defining treatment intervals therebetween, the method executable by a processor of a computer system (such as the processor of the computer system), the method 300 comprising: obtaining a segmented 3D model of a plurality of teeth of the subject, the segmented 3D model of each tooth of the plurality of teeth including at least crown portion data; obtaining a start position and a desired end position of each tooth of the plurality of teeth; determining an initial number of sequential treatment steps to move each tooth of the plurality of teeth from the start position to the desired end position, the initial number of sequential treatment steps being based on an initial distance of each treatment interval; for each tooth of the plurality of teeth, and for each treatment interval, determining a root force imposed on a root portion of the given tooth by the given aligner; and selectively executing: in response to the root force of each tooth of the plurality of teeth not exceeding a predetermined threshold value, determining that the determined initial number of sequential treatment steps is the determined orthodontic treatment; and in response to the root force, for any one of the teeth of the plurality of teeth, exceeding the predetermined threshold value, iteratively decreasing the initial distance of each treatment interval to provide a revised number of sequential treatment steps, and for each one of the determined revised number of sequential treatment steps re-calculating the root force imposed on the root portion of each tooth by the given aligner, until it is determined that the root force, of each tooth of the plurality of teeth, does not exceed the predetermined threshold value.

In certain embodiments, determining the root force imposed on the root portion of the given tooth in the given treatment interval comprises: simulating movement of the given tooth within the given treatment interval, based on simulation of the movement of the given tooth from the start position to the desired end position based on the segmented 3D model of the plurality of teeth; determining an impact force of the given orthodontic aligner used during the given treatment interval on the given tooth, based on the simulated movement of the given tooth within the given treatment interval; and determining the root force imposed on the root portion of the given tooth, based on the determined impact force and an anatomical consideration of the root portion of the given tooth.

In certain embodiments, the re-calculating the root force imposed on the root portion of each tooth by the given orthodontic aligner comprises: determining a revised impact force of the given orthodontic aligner used during the given treatment interval on the given tooth, based on the simulated movement of the given tooth within the given treatment interval; and determining a revised root force imposed on the root portion of the given tooth, based on the revised impact force and the anatomical consideration of the root portion of the given tooth.

In certain embodiments, the anatomical consideration of the root portion of the given tooth comprises root portion data including one or more of: a geometry of the root portion, an indication of a length of the root portion, crown portion topography, root portion topography, root portion surface area, and type of tooth.

In certain embodiments, the method further comprises obtaining the root portion data by obtaining CT scan data of the plurality of teeth, segmenting the CT scan data to separate the individual teeth, and parsing the CT scan data to separate crown portion data from root portion data.

In certain embodiments, the obtaining the segmented 3D model of the plurality of teeth comprises: obtaining 3D optical image data of the plurality of teeth, and digitally separating each tooth of the plurality of teeth in the 3D optical image data to obtain the segmented 3D image data of the plurality of teeth.

In certain embodiments, the impact force of the given orthodontic aligner is determined based on Finite Element Method (FEM) modelling.

In certain embodiments, the FEM modelling comprises imposing boundary conditions which reflect the interaction (or deformation) of an orthodontic aligner with the teeth, caused by contact of the teeth with the aligner, during a simulation of the movement of the teeth from the start position to the desired end position.

In certain embodiments, the impact force of the given aligner is based on one or more of: material property, configuration, and method of manufacture.

In certain embodiments, the root force comprises an average force imposed on periodontal ligaments around an entirety of the given tooth root portion.

In certain embodiments, the decreasing the initial distance comprises decreasing the initial distance by an amount proportional to an excess amount of the determined root force above the predetermined threshold.

In certain embodiments, the method further comprises determining intermediate collisions between adjacent teeth in the plurality of teeth for each treatment interval between each sequential treatment step of the initial number of sequential steps, the determining intermediate collisions being based on the determined simulated movement of each tooth.

In certain embodiments, the method further comprises displaying the determined intermediate collisions on a screen connected to the computer system, or sending instructions to display the intermediate collisions on a screen.

In certain embodiments, the method comprises one or both of: displaying the determined orthodontic treatment on a screen connected to the computer system; and sending production instructions to the manufacturing apparatus to generate the aligner according to the determined orthodontic treatment.

In certain embodiments, the obtaining a start position and a desired end position of each tooth of the plurality of teeth comprises defining the start position and the desired end position of each tooth as an x, y, z coordinate. In certain embodiments, the initial distance is about 200 microns.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

Certain aspects and embodiments of the present technology, are directed to methods and systems for making an orthodontic aligner, as well as to the aligner itself. More specifically, certain aspects and embodiments of the present technology comprise a computer-implemented method for determining a digital model of the aligner from which the aligner can be made, and a system for making the orthodontic aligner from the digital model. Certain embodiments of the present technology minimize, reduce or avoid some of the problems noted with the prior art, for example, in certain embodiments of the aligner obtained by embodiments of the present methods and systems, one or more of the following improvements are obtained: subject comfort, subject jaw alignment, minimization or reductions of forces on the teeth and ligaments of the subject, subject adherence to orthodontic treatment, and orthodontic treatment efficiency. This is achieved in certain embodiments of the present technology by the provision of super contact regions in the aligner comprising openings in the aligner, or thinned portions of the aligner. The openings or thinned portions are generally at occlusion surfaces between upper and lower teeth.

Figure 1:
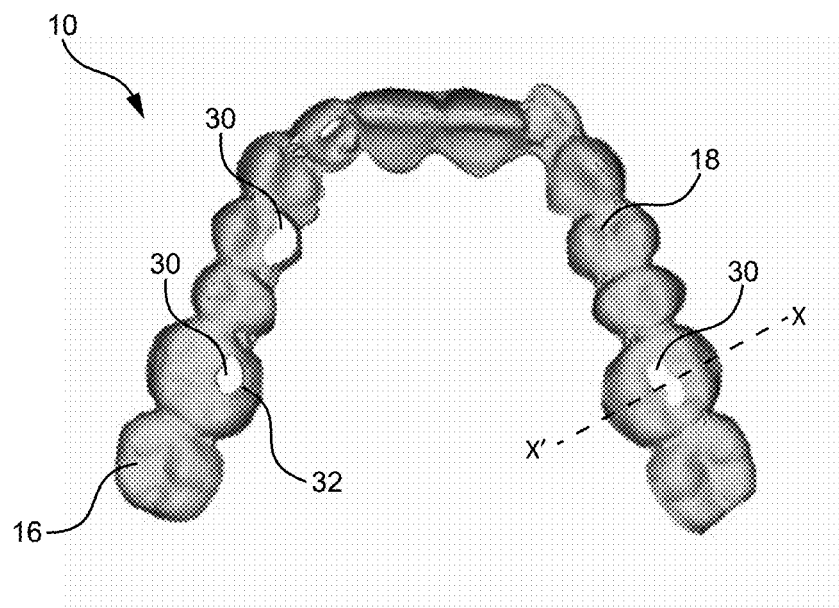
FIG. 1 is a schematic illustration of an orthodontic aligner according to certain embodiments of the present technology.
Figure 2:
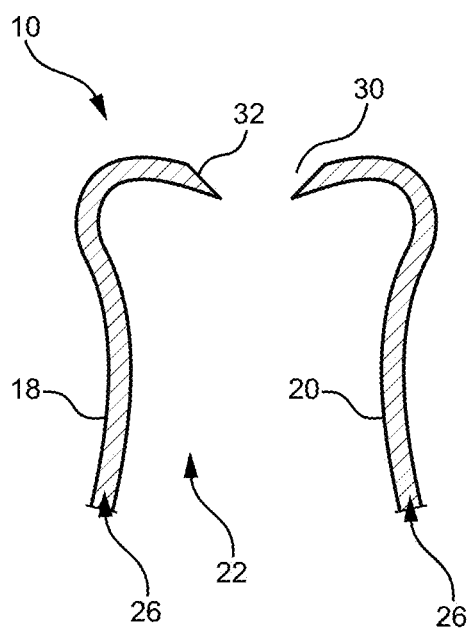
FIG. 2 is a schematic illustration of a cross-section of the orthodontic aligner of FIG. 1 through the line X-X', according to certain embodiments of the present technology.
Figure 3:
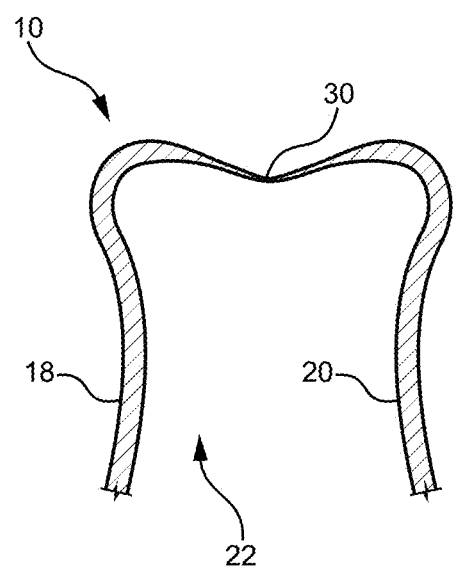
FIG. 3 is a schematic illustration of a cross-section of another embodiment of the orthodontic aligner of FIG. 2.

Referring initially to FIGS. 1 to 3, there is shown an aligner 10 (also referred to as "orthodontic aligner") according to certain aspects and non-limiting embodiments of the present technology. In this embodiment, the illustrated aligner 10 is for a lower archform 12 of a subject. In other embodiments (not shown), the aligner 10 is provided for the upper archform 14 of the subject. In yet other embodiments, aligners 10 for both the lower and upper archforms 12, 14 are provided.

Figure 4:
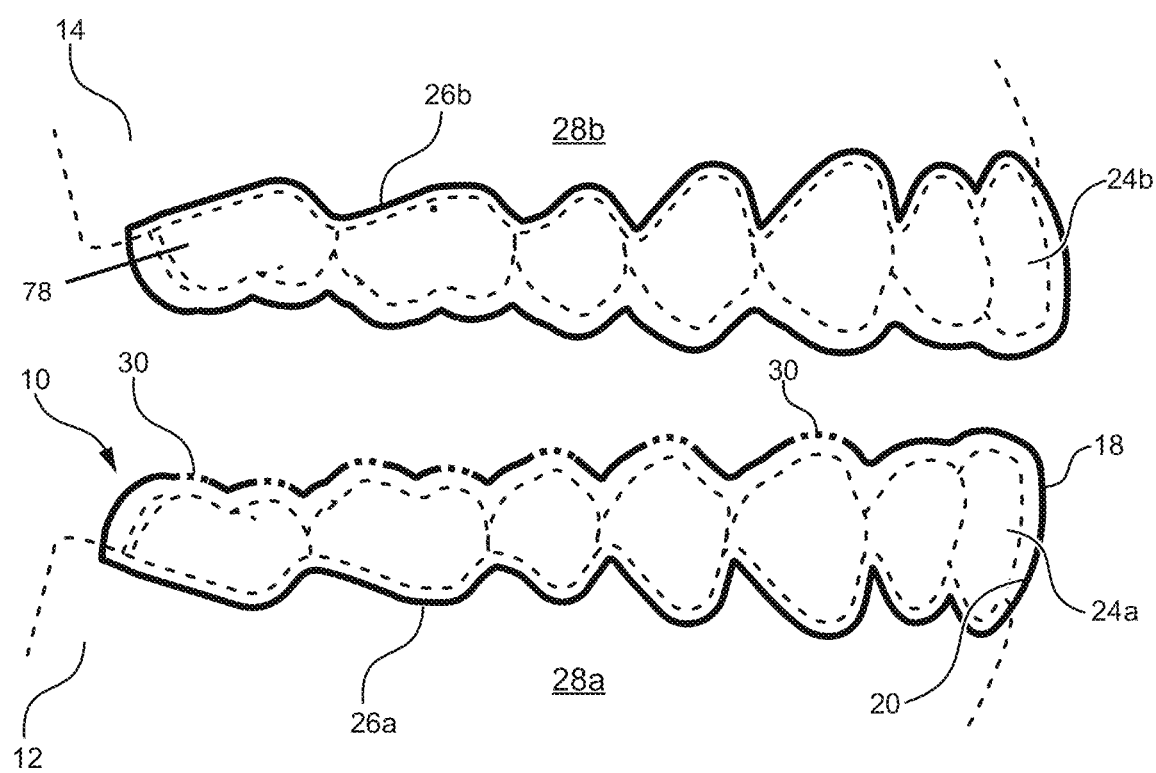
FIG. 4 is a side view of the aligner of FIG. 1 in use on a lower archform of a subject, according to certain embodiments of the present technology.

The aligner comprises an aligner body 16 having an outer surface 18 and an inner surface 20, the inner surface 20 defining a channel 22 for receiving at least some teeth 24 of the lower archform 12, and at least one edge 26 of the channel 22 for contact with the subject's gums 28. The lower archform 12 comprises lower teeth 24a and lower gums 28a (FIG. 4). The upper archform 14 comprises upper teeth 24b and upper gums 28b (FIG. 4). In the embodiments of FIGS. 1 to 3, the aligner 10 is arranged to receive all the lower teeth 24a of the lower archform 12 of the subject.

According to certain embodiments, the aligner 10 comprises super contact regions 30 defined in the aligner body 16. A thickness of the aligner body 16 at the super contact regions 30 is less than a thickness of the aligner body 16 in adjacent or other parts of the aligner 10. The super contact region 30 is defined by a boundary 32. In the embodiment of the aligner 10 illustrated in FIG. 2, the boundary 32 defines an opening 30. An edge of the boundary 32 can be tapered or blunt. The embodiment of the aligner 10 illustrated in FIG. 3 differs from that of FIG. 2 in that the super contact region 30 is a thinned portion 30 of the aligner body 16 instead of an opening 30. The boundary 32 defines the thinned portion 30. The super contact region 30 is determined according to certain embodiments of a method 300 of the present technology in terms of one or more of its position, its size, its configuration and the thickness of the aligner body 16 at the super contact region 30, which will be described later below.

As best seen in FIG. 4, in certain embodiments, the openings 30 defined in the aligner 10 coincide substantially with areas of higher contact between the upper teeth 24b of the upper archform 14 and the lower teeth 24a of the lower archform 12. Interposed portions of the aligner body 16 between the contacting surfaces of the upper archform 14 and the lower archform 12 at the super contact regions are thereby reduced (less material, thinner) compared to other contact regions which are not super contact regions. This in turn can help to reduce or minimize a separation between the upper teeth 24b of the upper archform 14 and the lower teeth 24a of the lower archform 12 of the subject whilst using the aligner 10.

In the embodiment of FIG. 4, the subject is provided with the aligner 10 for the lower archform 12, and an aligner of conventional form on the upper archform 14. In other embodiments (not shown), the subject is provided with aligners 10 according to embodiments according to the present technology for both the lower archform 12 and the upper archform 14. In other embodiments, the subject is provided with an embodiment of the aligner 10 for the upper archform 14 only. Therefore, aligners 10 according to embodiments of the present technology may be provided for one or both of the lower and upper archforms 12, 14, and optionally for use with a conventional type aligner.

In certain embodiments, the aligner body 16 has a generally uniform thickness other than at the super contact regions 30. In certain embodiments, the aligner body 16 thickness is about 0.7 mm. In certain other embodiments, the aligner body 16 thickness is selected from 0.7 mm, 0.75 mm, 0.8 mm, 0.85 mm, 0.9 mm, 0.95 mm, and 1.0 mm. In certain other embodiments (not shown), the aligner body 16 is non-uniform in thickness. The aligner body may include fixing blocks or treatment blocks (not shown).

The aligner body 16 is made of a polymer, such as a thermoplastic material. In certain embodiments, the aligner body 16 is made of poly-vinyl chloride (PVC). In certain other embodiments, the aligner body 16 is made of poly-ethylene terephthalate glycol (PETG), polycarbonate or thermoplastic polyurethanes. Other suitable materials can also be used to form the aligner body 16 of the aligner 10. The aligner body 16 is substantially transparent in certain embodiments, or translucent in other embodiments.

It will be appreciated that the present technology can be applied to different types, shapes, sizes and configurations of orthodontic aligners 10. For example, in certain other embodiments, the channel 22 is arranged to receive some, not all, of the teeth 24 of the lower archform 12 or the upper archform 14. It will also be appreciated that the orthodontic aligner 10 may be used for treating different types of teeth misalignment or malocclusion, including but not limited to one or more of: closing gaps ("space closure"), creating/widening gaps, tooth rotation, tooth intrusion/extrusion, and tooth translation, to name a few. In this respect, the inner surface 20 of the aligner 10 may be shaped to apply the desired orthodontic treatment to the teeth. In certain embodiments, the inner surface 20 of the aligner 10 includes positioning or treatment blocks (not shown).

In certain other embodiments, the aligner body 12 extends below the gum line and is arranged to cover at least a portion of the subject's gums in use.

Figure 5:
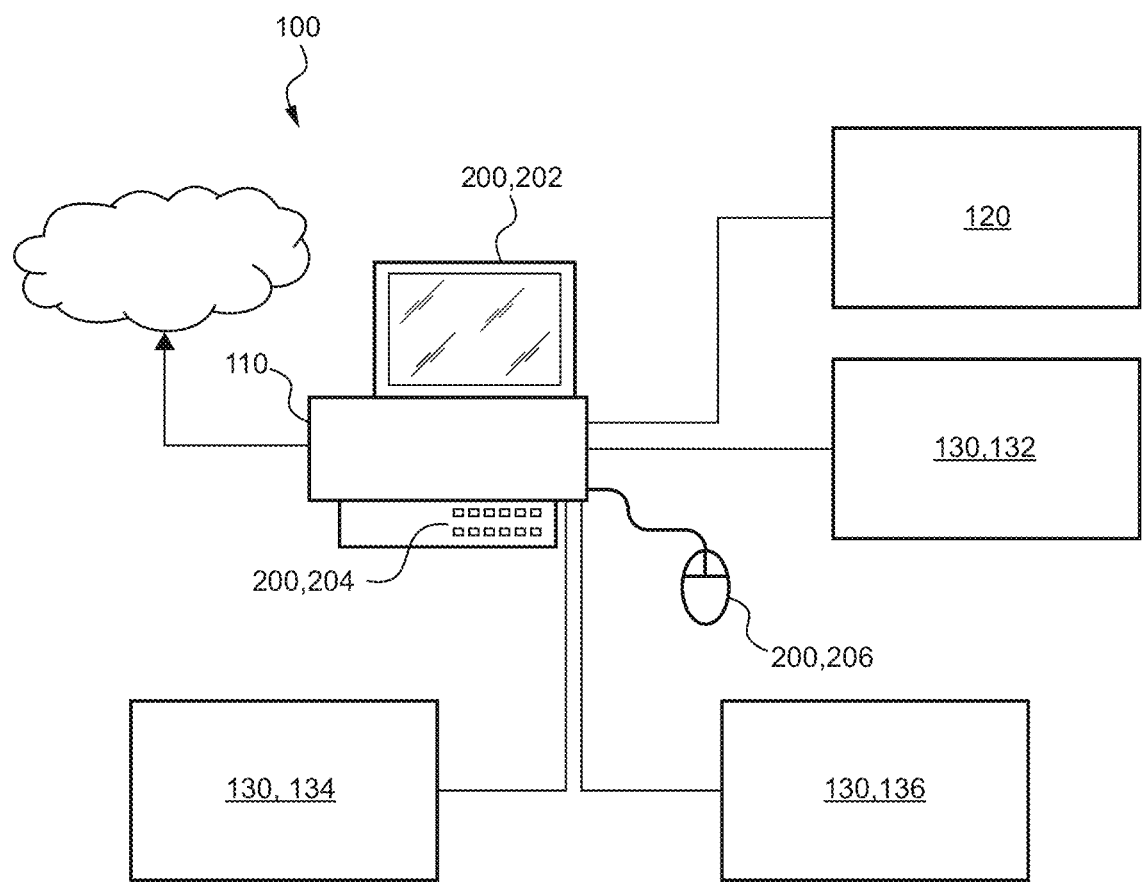
FIG. 5 is a system for making an orthodontic aligner, according to certain embodiments of the present technology.

Turning now to FIG. 5, in which is shown one embodiment of a system 100 suitable for making aligners 10 according to aspects and embodiments of the present technology.

It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Figure 21:
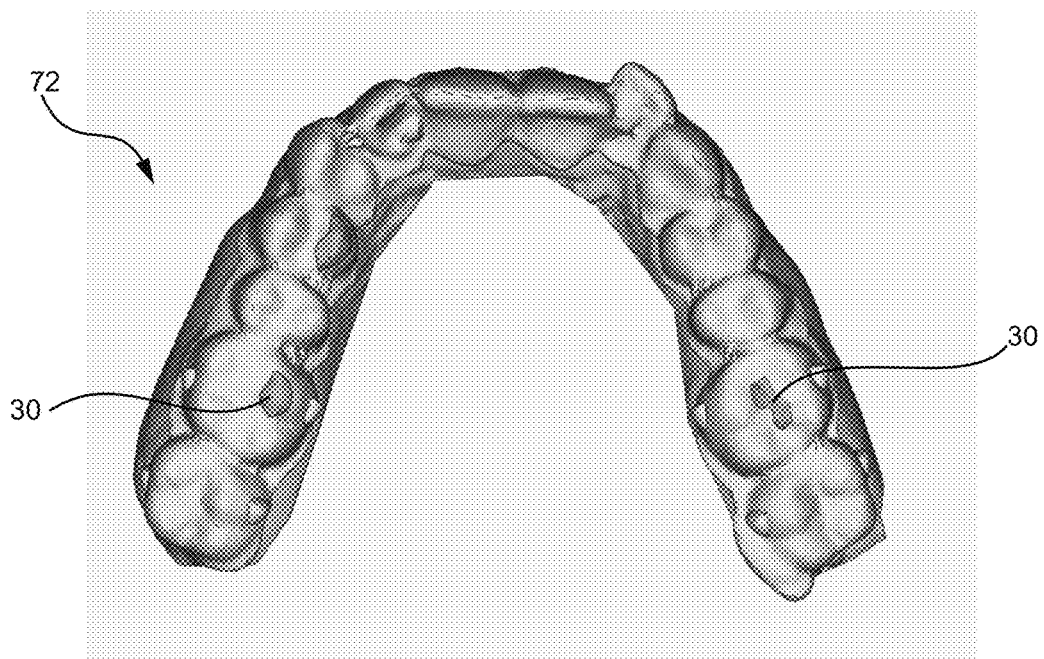
FIG. 21 illustrates a digital model of the aligner, according to certain embodiments of the present technology.
Figure 22:
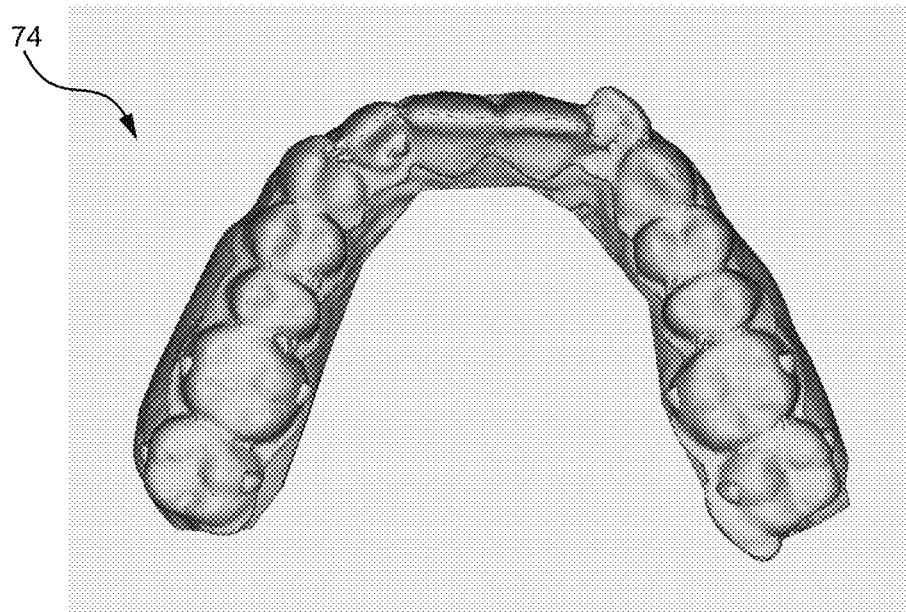
FIG. 22 illustrates a digital model of a pre-form aligner, according to certain embodiments of the present technology.

The system 100 of FIG. 5 comprises a computer system 110 for generating a digital model of the aligner 72 (FIG. 21) on which the aligner 10 will be based. The digital model of the aligner 72 includes one or more of the features of the super contact region 30 and the edge of the channel 26, as determined by embodiments of the method 300 of the present technology.

The digital model of the aligner 72 is arranged to deliver an orthodontic treatment according to a given orthodontic treatment step. Those features of size, shape and configuration of the digital model of the aligner 72 which are intended to render the orthodontic treatment are also embodied in a digital model of a pre-form aligner 74. The digital model of the pre-form aligner 74 differs from that of the digital model of the aligner 72, in certain embodiments, in that it does not include one or both of the super contact region 30 and the edge of the channel 26. In certain embodiments, the computer system 110 is also arranged to generate the digital model of the pre-form aligner 74 according to a desired orthodontic treatment. In certain other embodiments, the computer system 110 is arranged to obtain the digital model of the pre-form aligner 74 from another source.

The computer system 110 is configured to receive image data of the teeth 24 of the subject. In this respect, in certain embodiments, the computer system 110 is operatively coupled to at least one imaging device 120 which is arranged to provide the image data to the computer system 110. In certain embodiments, the image data can be provided to the computer system 110 in a different way, such as via a storage device (not shown) or via a communication network (not shown).

In certain embodiments, the system 100 comprises a manufacturing apparatus 130 for making at least a portion of the aligner 10. In certain embodiments, the aligner 10 is formed by finishing a pre-form aligner, the pre-form aligner having been made according to the digital model of the pre-form aligner 74. The finishing of the pre-form aligner may include one or both of (i) forming the openings 30 of the super contact regions 30 in the aligner body 16, and (ii) forming the edge 26 of the channel 22, according to the digital model of the aligner 72. In this respect, in certain embodiments, the manufacturing apparatus 130 comprises one or more of a laser apparatus 132 for finishing the pre-form aligner, a pre-form aligner manufacturing system 134, and an aligner manufacturing system 136. In certain other embodiments, the aligner 10 is made by forming directly from the digital model of the aligner 72, such as by 3D printing the aligner 10 incorporating the openings 30 therein.

In certain embodiments, the computer system 110 is connectable to one or more of the imaging device 120, the laser apparatus 132, the pre-form aligner manufacturing system 134, and the aligner manufacturing system 136. In some embodiments, the communication network is the Internet and/or an Intranet. Multiple embodiments of the communication network may be envisioned and will become apparent to the person skilled in the art of the present technology.

Figure 6:
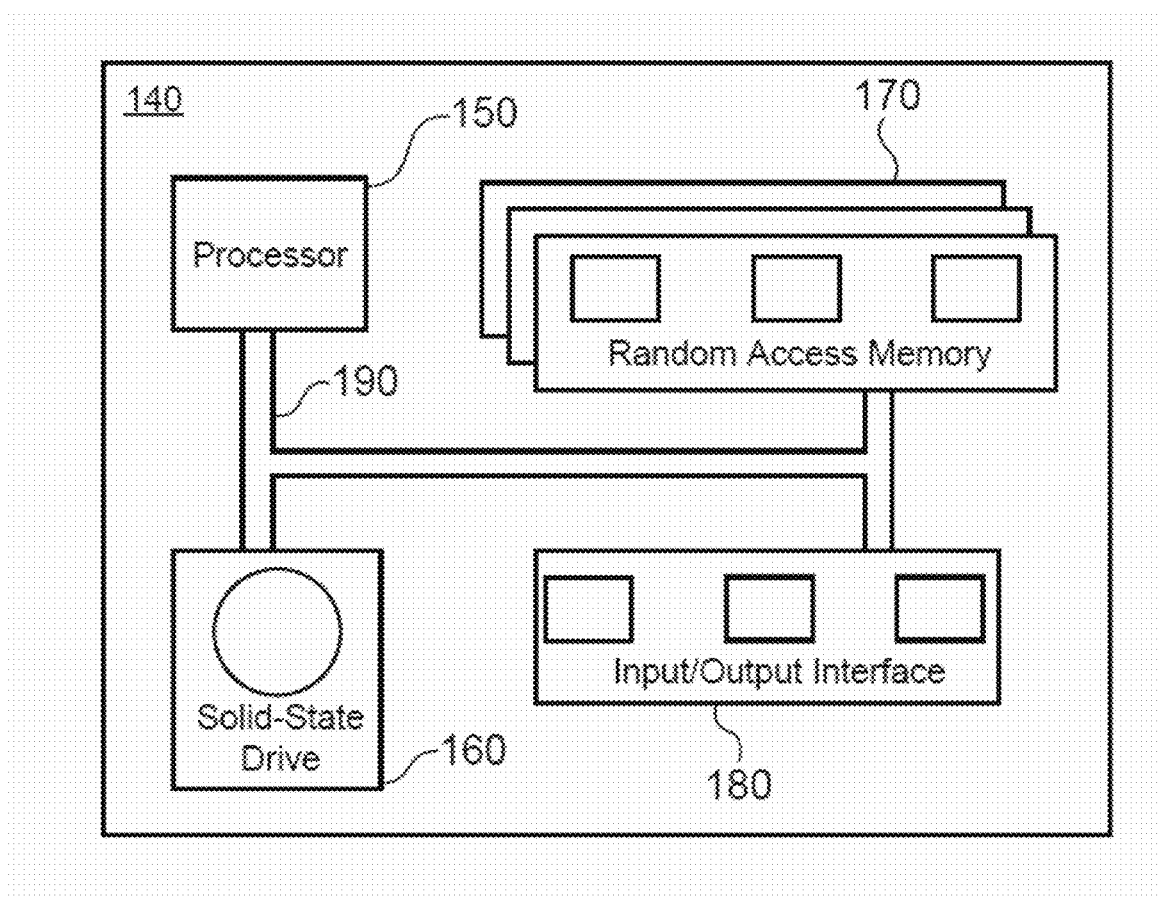
FIG. 6 is a computing environment of the system of FIG. 5, according to certain embodiments of the present technology.

Turning now to FIG. 6, certain embodiments of the computer system 110 have a computing environment 140 as illustrated schematically in FIG. 6. The computing environment comprises various hardware components including one or more single or multi-core processors collectively represented by a processor 150, a solid-state drive 160, a random access memory 170 and an input/output interface 180. Communication between the various components of the computing environment 140 may be enabled by one or more internal and/or external buses 190 (e.g. a PCI bus, universal serial bus, IEEE 1394 "Firewire" bus, SCSI bus, Serial-ATA bus, ARINC bus, etc.), to which the various hardware components are electronically coupled.

The random access memory 170 is configured in any known manner and arranged to store one or more of: set-up data, subject data, subject medical records of one or more subjects, archform image data of the one or more of the subjects, and orthodontic treatment data. The orthodontic treatment data comprises, for example, material properties (e.g. composition, elastic modulus, yield strength and spring back values) for different aligner materials, number of treatment steps, information on the aligners to be used in the treatment steps, a treatment duration, and the like. Other data relating to any type of orthodontic treatment or aligner 10 can also be included in the random access memory 170.

The input/output interface 180 allows enabling networking capabilities such as wire or wireless access. As an example, the input/output interface 180 comprises a networking interface such as, but not limited to, a network port, a network socket, a network interface controller and the like. Multiple examples of how the networking interface may be implemented will become apparent to the person skilled in the art of the present technology.

For example, but without being limiting, the networking interface 180 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 160 stores program instructions suitable for being loaded into the random access memory 170 and executed by the processor 150 for executing the methods 300 according to certain aspects and embodiments of the present technology. For example, the program instructions may be part of a library or an application.

In this embodiment, the computing environment 140 is implemented in a generic computer system which is a conventional computer (i.e. an "off the shelf" generic computer system). The generic computer system is a desktop computer/personal computer, but may also be any other type of electronic device such as, but not limited to, a laptop, a mobile device, a smart phone, a tablet device, or a server.

In other embodiments, the computing environment 140 is implemented in a device specifically dedicated to the implementation of the present technology. For example, the computing environment 140 is implemented in an electronic device such as, but not limited to, a desktop computer/personal computer, a laptop, a mobile device, a smart phone, a tablet device, a server, specifically designed for determining the orthodontic treatment. The electronic device may also be dedicated to operating other devices, such as one or more of the imaging device 120, the laser apparatus 132, the pre-form aligner manufacturing system 134, and the aligner manufacturing system 136.

In some embodiments, the computer system 110 is connected to one or more of the imaging device 120, the laser apparatus 132, the pre-form aligner manufacturing system 134, and the aligner manufacturing system 136. In some alternative embodiments, the computer system 110 or the computing environment 140 is implemented, at least partially, on one or more of the imaging device 120, the laser apparatus 132, the pre-form aligner manufacturing system 134, and the aligner manufacturing system 136. In some alternative embodiments, the computer system 110 may be hosted, at least partially, on a server. In some alternative embodiments, the computer system 110 may be partially or totally virtualized through a cloud architecture.

Referring back to FIG. 5, the computer system 110 has at least one interface device 200 for providing an input or an output to a user of the system 100. In the embodiment of FIG. 5, the interface device is a screen 202 for providing a visual output to the user of the system 100, the visual output being one or more of the images of the lower archform 12 and/or the upper archform 14, the digital model of the aligner 72, the digital model of the pre-form aligner 74, and the orthodontic treatment plane, for example. In other embodiments, the interface device 200 may be a monitor, a speaker, a printer or any other device for providing an output in any form such as image-form, written form, printed form, verbal form, 3D model form, or the like.

In the embodiment of FIG. 5, the interface device 200 also comprises a keyboard 204 and a mouse 206 for receiving input from the user of the system 100. Other interface devices 200 for providing an input to the computer system 110 can include, without limitation, a USB port, a microphone, a camera or the like.

The computer system 110 may be connected to other users, such as through their respective clinics, through a server (not depicted). The computer system 110 may also be connected to appointment management software which could schedule appointments or follow-ups based on the orthodontic treatment.

In some embodiments, the computing environment 140 is distributed amongst multiple systems, such as one or more of the imaging device 120, the laser apparatus 132, the pre-form aligner manufacturing system 134, and the aligner manufacturing system 136 and/or the server. In some embodiments, the computing environment 140 may be at least partially implemented in another system, as a subsystem for example. In some embodiments, the computer system 110 and the computing environment 140 may be geographically distributed.

As persons skilled in the art of the present technology may appreciate, multiple variations as to how the computing environment 140 is implemented may be envisioned without departing from the scope of the present technology.

Turning now to the imaging device 120 shown in FIG. 5, any device which can capture and/or process images of the teeth and/or surrounding tissues of the subject can be used. In certain embodiments, the images comprise one or more of: images of the upper archform 14; images of the upper teeth 24b; images of the upper gums 28b; images of the lower archform 12; images of the lower teeth 24a; images of the lower gums 28a; images of the crown portion (external) of the teeth; images of the crown portion (internal); images of the root portion (external); images of the root portion (internal); images of the surrounding tissues; images of the nerve pathways in the teeth and in the surrounding soft tissue; images of the bone near the teeth; and images of the oral region. The images can be two-dimensional or three-dimensional.

In certain embodiments, the images are one or more of: computed tomography (CT) images, x-ray images, digitalized three-dimensional physical model images, magnetic resonance images, nuclear medicine images, photographic images, and the like. Any type of image format visualizing the teeth and/or the surrounding areas is acceptable within the context of the present technology.

In certain embodiments, the imaging device 120 is an intra-oral scanner 122 providing three-dimensional digital models of the teeth 16 and of the gums 28 of one or both of the lower archform 12 and the upper archform 14. Intra-oral scanners 122 typically have a component which can be received in the oral region and having a light source for providing light to the oral region requiring imaging and an imaging sensor for capturing images of the oral region. A computer system component of the intra-oral scanner 122 can receive the captured images and create digital 3D surface models (e.g. a "mesh") of the oral region. This technique provides an alternative to making traditional plaster models of the oral region followed by their digital imaging. The imaging device 120 may comprise an imaging device processor for storing the images and optionally for processing the images. The intra-oral scanner 122 can provide images in STL and/or OBJ format. Any other image format is also included within the scope of the present technology.

Turning now to the laser apparatus 132 of the system 100 of FIG. 5, the laser apparatus 132 emits a laser beam for processing the pre-form aligner to produce the aligner 10 such as by applying the super contact region 30 as a cut-out or as a thinned portion of the body 16, and optionally for forming the edge 26 of the channel 22. In this respect, the processor 150 of the computer system 140 is operatively communicable with the laser apparatus 132 to ensure correct placement of the laser beam in accordance with the determined digital model of the aligner 72. The laser apparatus 132 can be any appropriate apparatus able to provide a high energy beam. The laser apparatus 132 may be a carbon-dioxide or an argon-based laser apparatus 132.

In alternative embodiments, instead of the laser apparatus 132, the system 100 is provided with a cutting apparatus, such as a milling apparatus, a sawing apparatus, or the like, for cutting the pre-form aligner to produce the aligner 10 including the super contact region 30.

Optionally, the system 100 includes the pre-form aligner manufacturing system 134 which can include any apparatus suitable for making pre-form aligners. In certain embodiments, the pre-form aligner manufacturing system 134 of FIG. 5 comprises apparatus for preparing a physical mould for making an aligner pre-form, as well as apparatus for making the aligner pre-form from the physical mould using a thermoforming process. By pre-form aligner mould is meant a physical three-dimensional mould of a pre-form aligner. The pre-form aligner differs from the aligner 10 in that it does not include all the features of the aligner 10 such as the openings 30 or thinning at the super contact regions 30. Although the aligner 10 is arranged to stop short at a gum line 52 of the subject, in certain embodiments, the pre-form aligner mould includes portions of the subject's gums. The pre-form aligner will include gum portions which are trimmed when making the aligner 10 from the pre-form aligner.

In certain embodiments, the pre-form aligner manufacturing system 134 comprises an additive manufacturing apparatus for printing the physical mould for the pre-form aligner using any suitable material such as photopolymer resin. The pre-form aligner mould can be made in any other manner and using any suitable materials such as plaster, wax or elastomeric materials. A curing apparatus may be provided for curing or post-curing the physical mould for the pre-form aligner using any one or more of light, heat, chemicals or the like. The additive manufacturing apparatus is arranged to receive instructions from the processor 150 of the computer system 110 to make the physical mould. In certain embodiments, a digital model for making the physical mould is that same as, or based on, the digital model of the pre-form aligner 74. In certain embodiments, the pre-form aligner model is made in any other manner and using any suitable materials such as plaster, wax or elastomeric materials.

In certain embodiments, the pre-form aligner manufacturing system 134 comprises a thermoforming apparatus for forming the pre-form aligner from the physical mould using a thermoforming process. The thermoforming process comprises coating the physical mould with a suitable aligner material in liquid form, such as thermoplastic material, e.g. poly-vinyl chloride (PVC), polycarbonate, polyurethane, or polyethylene terephthalate glycol (PETG), followed by solidification of the material. In this respect, the thermoforming apparatus comprises heating apparatus for heating solid phase thermoplastic materials in order to soften the thermoplastic materials and coat them over the physical mould.

In certain embodiments, the aligner 10 is made directly from the digital model 72 (and not by finishing the pre-form aligner). In these embodiments, the system 100 includes the aligner manufacturing system 136 for forming the aligner 10 directly from the digital model of the aligner 72. The aligner manufacturing system 136 may comprise an additive manufacturing apparatus (also referred to as a 3D printing apparatus) arranged to receive instructions from the processor 150 of the computer system 110 for printing the aligner 10 according to the digital model of the aligner 72 using any suitable material. The digital model of the aligner 72 includes the boundary 32 of the super contact regions 30 and so the aligner 10 thus obtained includes the super contact regions 30 defined in the aligner body 16 as an opening or as a thinned region.

In certain embodiments, the system 100 is arranged to make the aligner 10 as follows: (1) The physical mould is made according to the digital model of the preform aligner 72. The digital model of the preform aligner 74 is based on images of subject's archforms and an orthodontic treatment to be applied to the subject's archform. This step can be performed by the preform aligner manufacturing system 134 (e.g. apparatus for casting a physical mould). (2) The preform aligner is made by thermoforming a suitable workpiece over the physical mould. This step can be performed by the preform aligner manufacturing system 134 (e.g. thermoforming apparatus. (3) The aligner 10 is made by processing the preform aligner according to the digital model of the aligner 72, e.g. by forming the thinned super contact regions 30 and cutting along the gum line. This step can be performed by the laser apparatus 132.

Figure 7A:
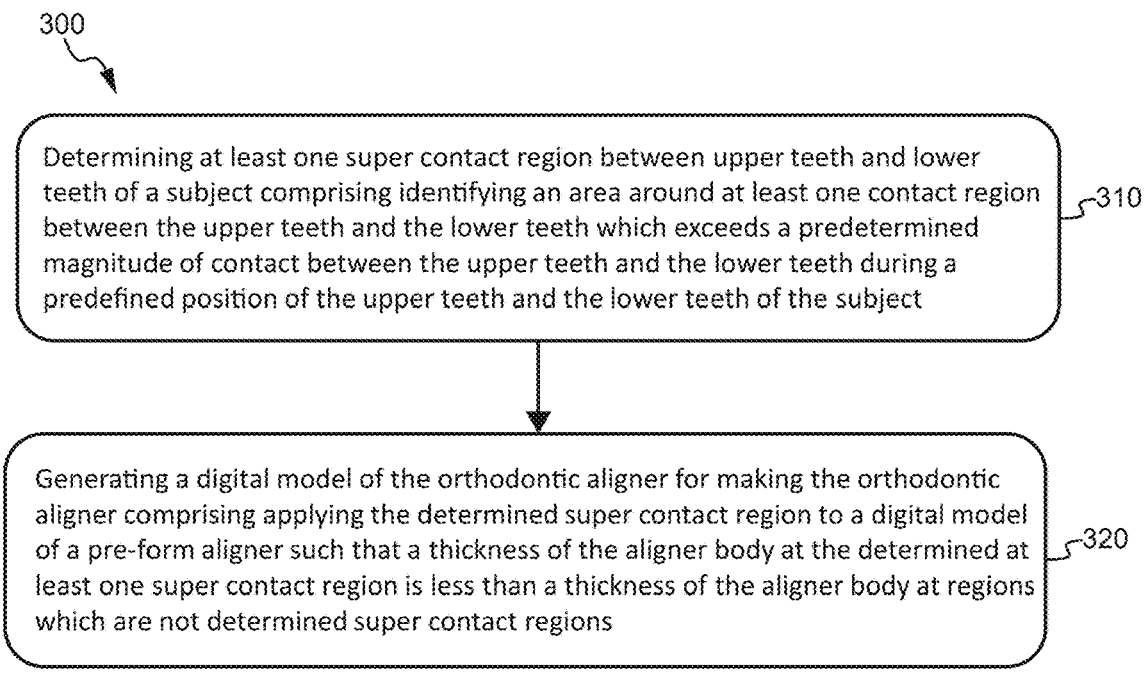
FIG. 7A illustrates method steps for making the orthodontic aligner, according to certain embodiments of the present technology.

With reference now to FIG. 7A, in certain embodiments the computer system 110 is configured to execute the method 300 for making the aligner 10. More specifically, the method 300 is configured to determine the digital model of the aligner 72. The method 300 will now be described in further detail below and with reference to FIGS. 7A and 7B.

STEP 310: Determining, by the Processor, at Least One Super Contact Region Between Upper Teeth and Lower Teeth of a Subject, the Determining the at Least One Super Contact Region Comprising Identifying an Area Around at Least One Contact Region Between the Upper Teeth and the Lower Teeth which Exceeds a Predetermined Magnitude of Contact Between the Upper Teeth and the Lower Teeth During a Predefined Position of the Upper Teeth and the Lower Teeth of the Subject The method 300 commences, in certain embodiments, by determining the at least one super contact region 30 between the upper teeth 24b and the lower teeth 24a of a subject (FIG. 7A). In certain embodiments, this comprises identifying an area around at least one contact region 42 between the upper teeth 24b and the lower teeth 24a which exceeds a predetermined magnitude of contact between the upper teeth 24b and the lower teeth 24a during a predefined position of the upper teeth 24b and the lower teeth 24a of the subject.

Determining the Contact Region

Figure 7B:
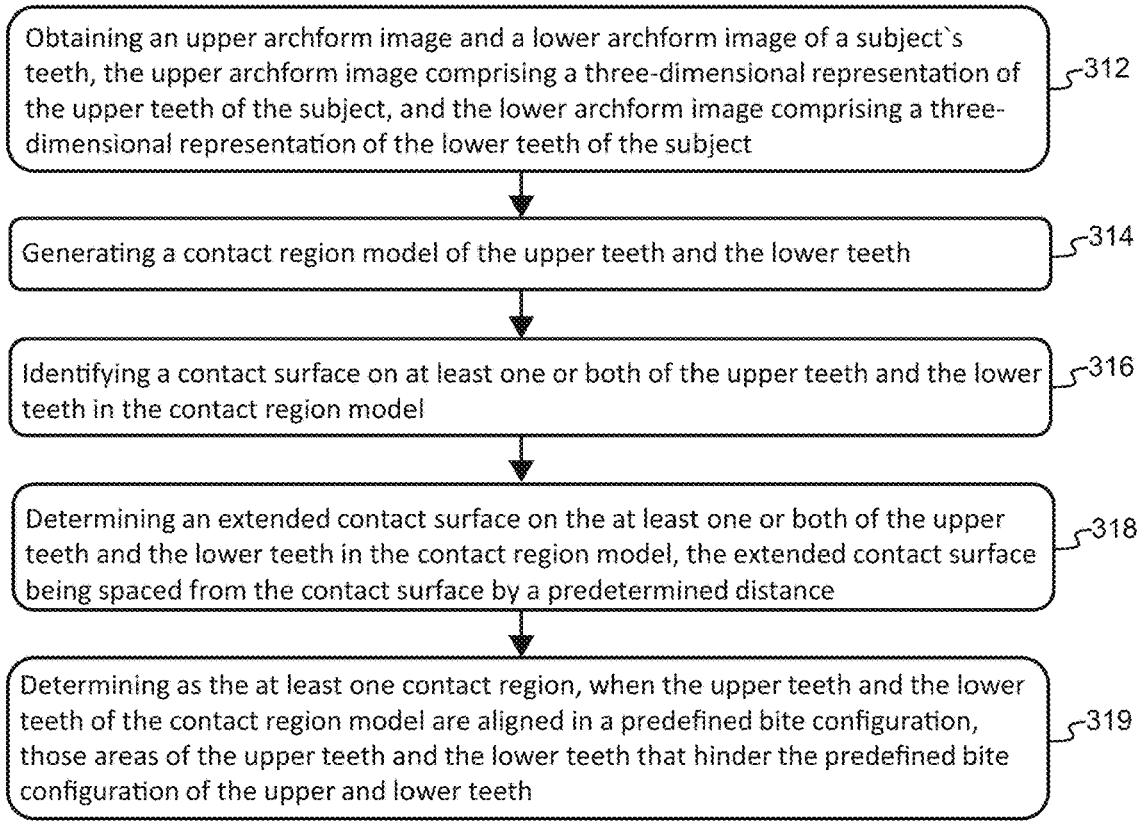
FIG. 7B illustrates certain other steps of the method of FIG. 7A for making the orthodontic aligner, according to certain embodiments of the present technology.

In certain embodiments, the various steps for determining the at least one contact region 42 is illustrated in FIG. 7B. It commences with the computer system 110 obtaining images of the lower archform 12 and upper archform 14 of the subject (Step 312). In certain embodiments, the images are three-dimensional images of one or more of the lower teeth 24a, portions of the lower gums 28a, upper teeth 24b, and portions of the upper gums 28b of the lower and upper archforms 12, 14, respectively. The images of the teeth 24 comprise images of at least a crown portion 48 of the teeth 24. Some root portions may also be at least partially visible, particularly those visible through periodontal pockets at the gum line 52 of the subject. In certain embodiments, the images also include the surrounding tissues. In certain embodiments, the images comprise images of the crown portions 48 of the teeth 24 only.

In certain embodiments, the images are obtained such as by importing from the memory 130 of the computer system 100, after having been obtained by an imaging device 120 such as the intra-oral scanner 122 of the system 100. Alternatively one or both of the lower archform images 44 and the upper archform images 46 may have been obtained from any other memory, such as that of the intra-oral scanner 122 itself. In a yet alternative embodiment, the images may have been obtained directly from the imaging device 120 such as the intra-oral scanner 122.

In Step 314 of FIG. 7B, the method 300 continues with the processor 150 generating a contact region model 54 (shown in FIGS. 8 and 9) of the upper teeth 24*b* and the lower teeth 24*a* based on the images of the upper and lower archforms 14, 12.

In certain embodiments, the contact region model 54 is a digital model based on the upper teeth 24*b* and the lower teeth 24*a*. In certain embodiments, the contact region model 54 is a digital model based on at least the crown portion 48 of the upper teeth 24*b* and the lower teeth 24*a* of the subject. The contact region model 54 can be obtained in any suitable manner. For example, the contact region model 54 may be derived from the image of the teeth of the subject using any method suitable for converting images to digital models.

In other embodiments, the contact region model 54 is obtained directly as a digital model, such as using the intra-oral scanner 122 or any other suitable device or system.

In Step 316, the method 300 comprises identifying a contact surface 56 on at least one or both of the upper teeth 24*b* and the lower teeth 24*a* in the contact region model 54. The contact surface 56 comprises, in certain embodiments, a bite surface or a bite edge of the teeth. In certain other embodiments, the contact surface 56 comprises an outer surface of the crown portion 48 of at least one of the upper teeth 24*b* and the lower teeth 24*a*.

In Step 318, the method 300 continues with determining an extended contact surface 58 on the at least one or both of the upper teeth 24*b* and the lower teeth 24*a* in the contact region model 54, the extended contact surface 58 being spaced from the contact surface 56 by a predetermined distance. The predetermined distance is a thickness of the aligner 10 in certain embodiments. Therefore, in certain embodiments, the contact region model 54 with the extended contact surface 58 can be considered as the digital model of the pre-form aligner 72 for the respective teeth 24. The extended contact surface 58 is determined by transposing the contact surface 56 by the determined distance away from the teeth 24. In other words, the extended contact surface 58 is an offset of the contact surface 56 in a direction normal to the teeth 24 such that the contact region model 54 with the extended contact surface 58 is larger, extended version of the contact region model 54 with the contact surface 56 by a specified offset.

Figure 11A:
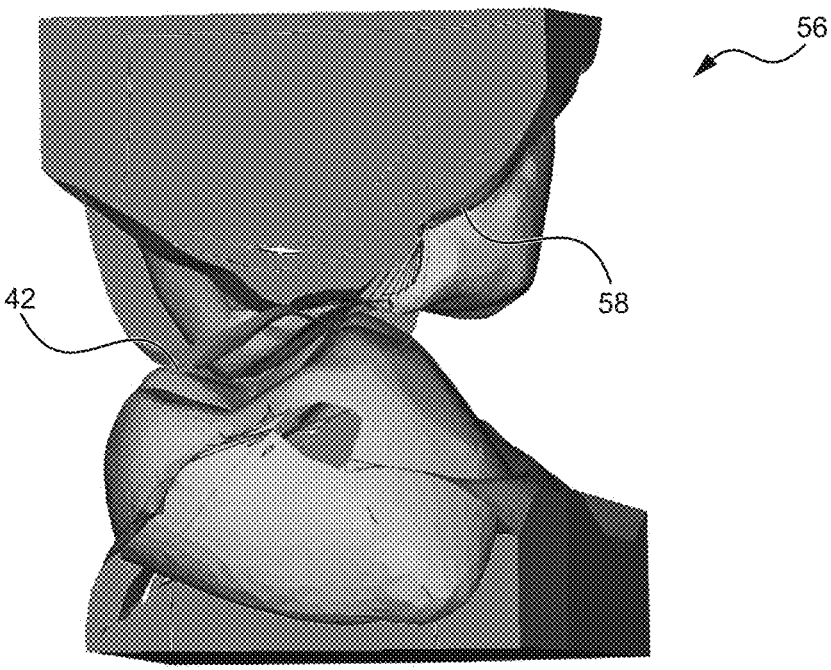
FIG. 11A illustrates a portion of the digital models FIG. 8 showing an extended surface and contact zones, according to certain embodiments of the present technology.
Figure 11B:
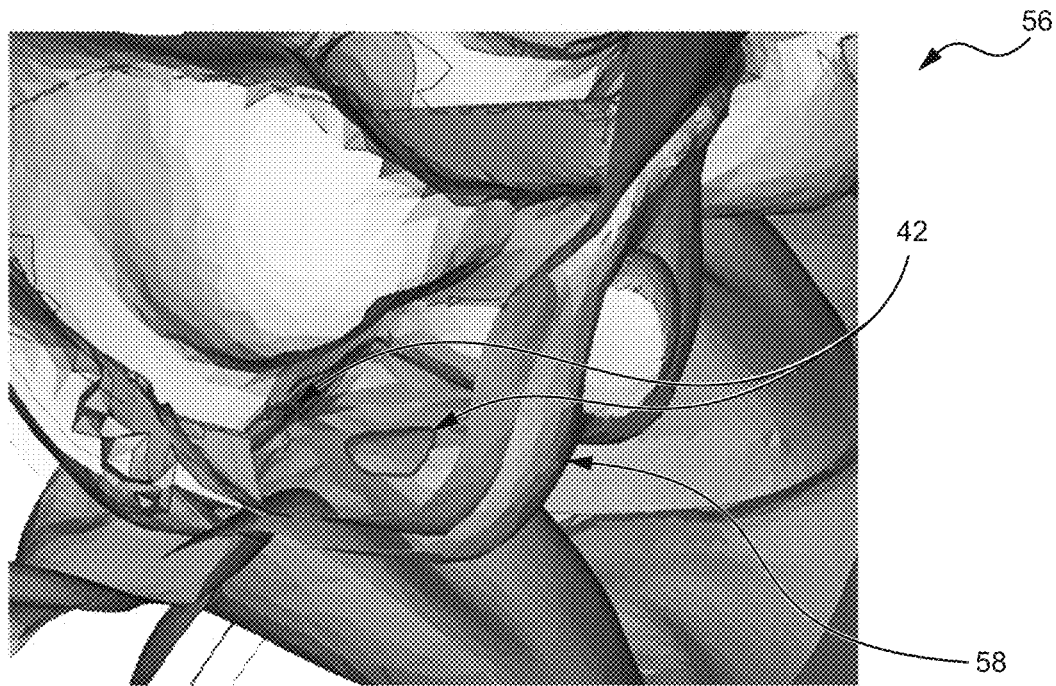
FIG. 11B illustrates a zoomed-in portion of the digital model of the lower archform and the upper archform of FIG. 11A, according to certain embodiments of the present technology.

In certain embodiments, the determination of the extended contact surface 58 also includes taking into account a treatment step of the teeth 24 of the patient. It is to be noted that in the case that the contact region model 54 including the extended contact surface 58 represents the digital model of the pre-form aligner 74, an interior surface of the aligner 10 will be shaped and sized according to the desired treatment. FIGS. 11A and 11B illustrate the digital models of the upper archform 14 and the lower archform 12, with the extended contact surface 58.

In Step 319, the method 300 comprises determining as the at least one contact region 30, when the upper teeth 24*b* and the lower teeth 24*a* of the contact region model 54 are aligned in a predefined bite configuration, those areas of the upper teeth 24*b* and the lower teeth 24*a* that hinder the predefined bite configuration of the upper teeth 24*b* and the lower teeth 24*b*, based on: opposing extended contact surfaces 58 of the upper teeth 24*b* and the lower teeth 24*a* of the contact region model 54, or the extended contact surface 58 of one of the upper teeth 24*b* and the lower teeth 24*a* of the contact region model 54, and the contact surface 56 of the other of the upper teeth 24*b* and the lower teeth 24*a* of the contact region model 54. The offset is determined based on the thickness of the aligners 10 that will be positioned between the opposing teeth 24. In certain embodiments, this step assumes that both the lower teeth 24*a* and the upper teeth 24*b* will each have an aligner 10. In certain other embodiments, the offset is determined based on a single aligner offset for the subject.

Figure 8:
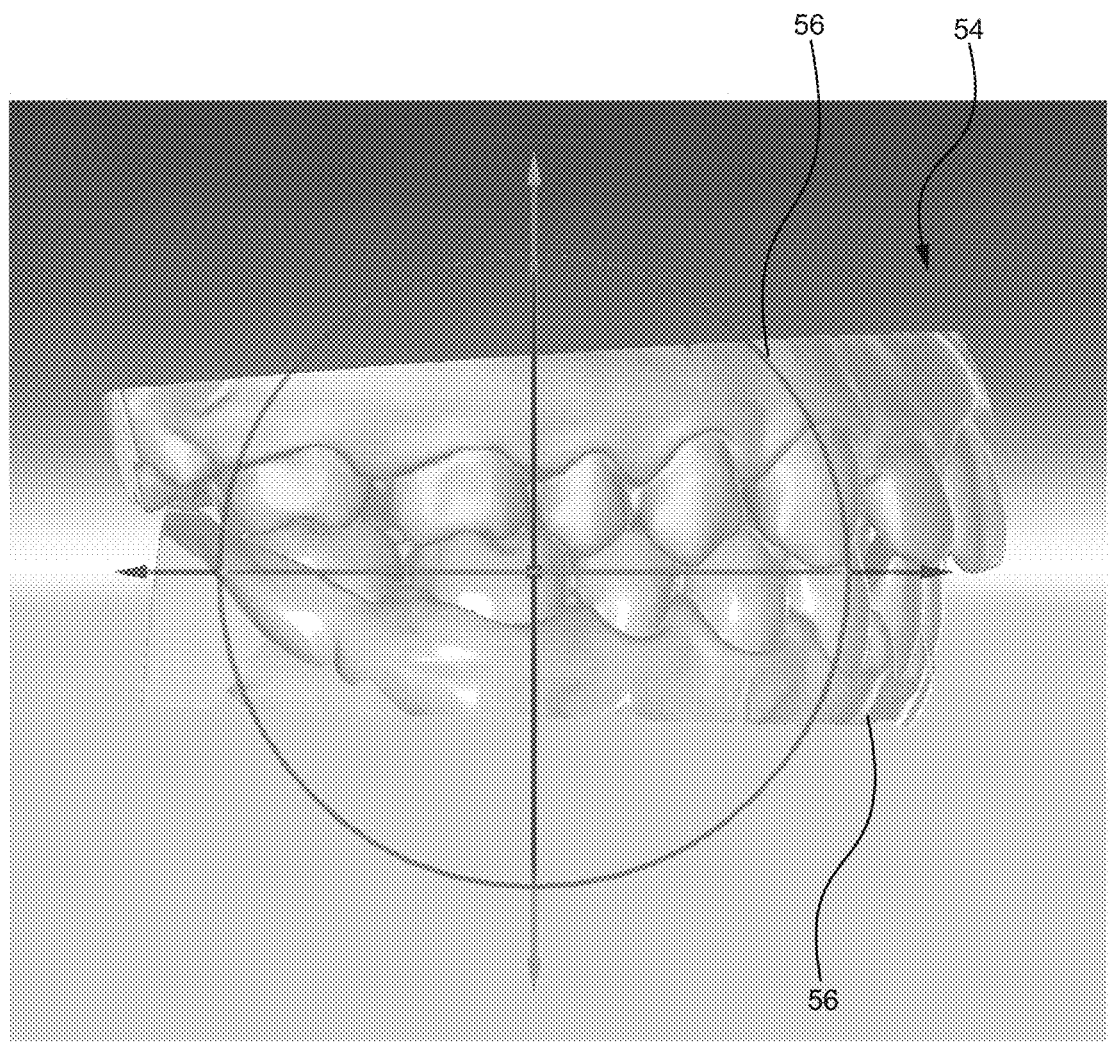
FIG. 8 illustrates digital models of a lower archform and an upper archform used during the method of FIG. 7A, according to certain embodiments of the present technology.
Figure 9:
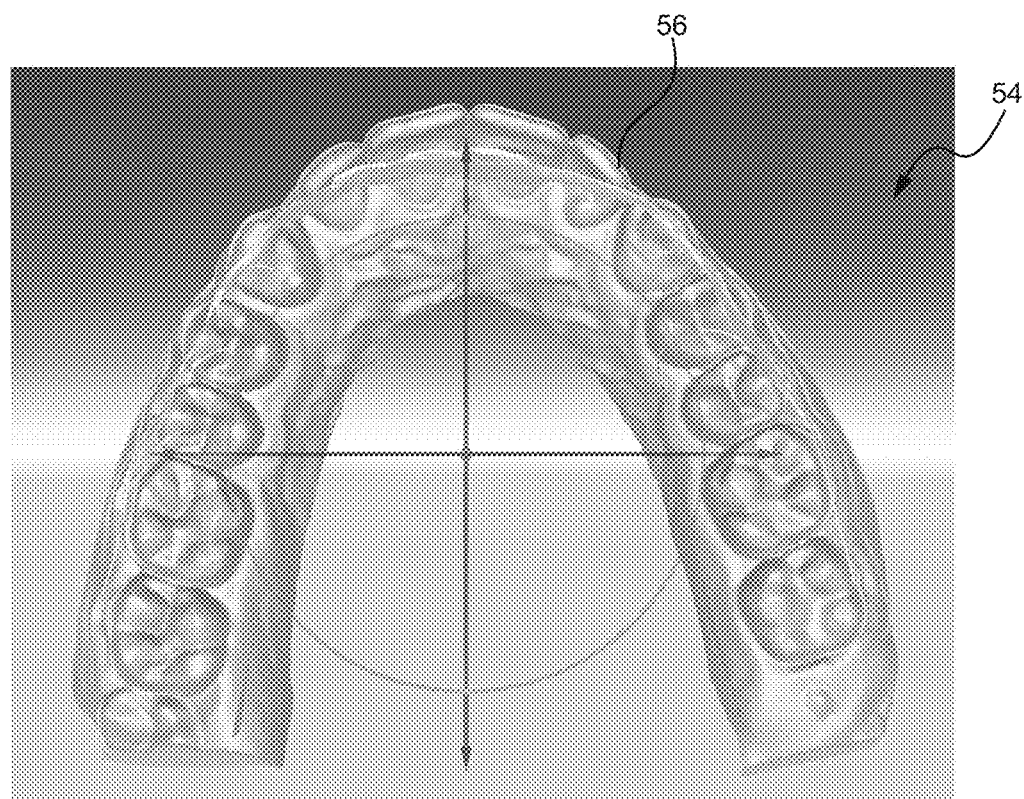
FIG. 9 illustrates the digital model of the lower archform of FIG. 8 made translucent, and superimposed, on the digital model of the upper archform of FIG. 8, according to certain embodiments of the present technology.
Figure 10:
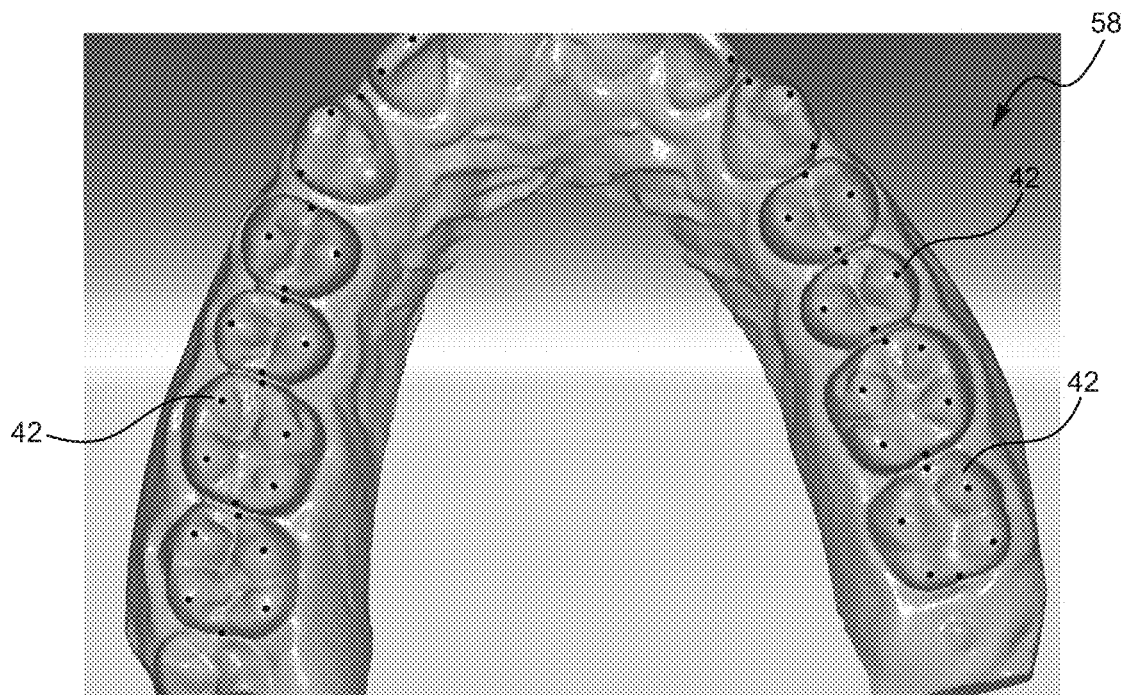
FIG. 10 illustrates the digital model of the upper archform image of FIG. 8, and including contact regions, according to certain embodiments of the present technology.

In certain embodiments, the method 300 further includes, before step 319, a step of aligning the upper teeth 24*b* and the lower teeth 24*a* of the contact region model 54 the predefined bite configuration (FIGS. 8 and 9). The alignment can be performed in one or two dimensions. The predetermined position is a natural "bite" or a desired "bite" of the subject. In other embodiments, the predetermined position is any other predetermined position. The predetermined bite position can be determined for the subject in any manner.

Figure 12:
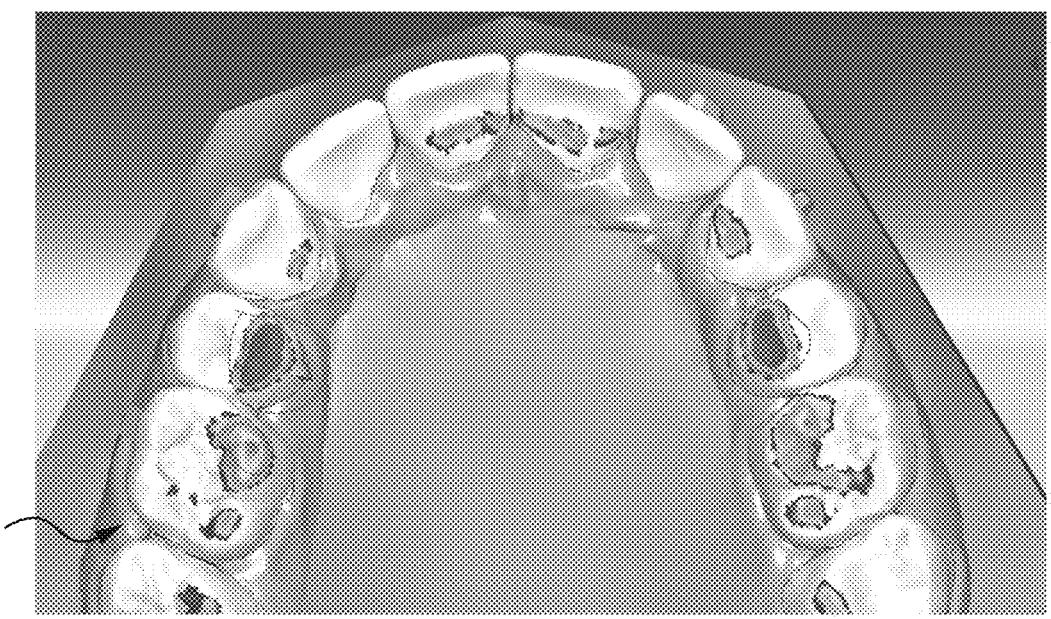
FIG. 12 illustrates the digital model of the upper archform of FIG. 8, and including heat maps, according to certain embodiments of the present technology.

The determined contact regions 42 on the extended contact surface 58 of the contact region model 54, according to certain embodiments, are illustrated in FIGS. 11A, 11B and 12. The contact region 42 is an identified area or point on the aligner 10 which would potentially hinder the predefined bite configuration of the lower teeth 24*a* and the upper teeth 24*b* if one or both of the lower teeth 24*a* and the upper teeth 24*b* were enclosed by the aligner 10. By this is meant that the contact region is a point or an area on the given tooth 24, or given opposing teeth 24, that approach(es) each other close enough to hinder a natural "resting bite" configuration. In other words, the contact region 42 can be considered as point or points of potential occlusion between opposing teeth 24 of the lower and upper archforms 12, 14 in the predetermined configuration due to the aligner(s) 10 between the opposing teeth 24.

In certain embodiments, determining the contact regions 42 comprises identifying points of contact between opposing extended contact surfaces 58 of the aligned contact region models 54. The contact regions 42 are determined by measuring the surface-to-surface distance of the extended contact surfaces 58 in certain embodiments.

By means of certain embodiments of the method 300, the purpose of the determined contact region 42 is to enable the determination of the super contact regions 30 such that material can be removed at the super contact regions 30 on the aligner 10 to provide a more comfortable "resting bite" configuration.

It will be appreciated that although Step 310 has been described and illustrated in relation to contact regions 42 relating to the upper archform 14, it is equally applicable to contact regions 42 on the lower archform 12.

In certain other embodiments, the contact regions 42 are identified in another manner than that described above. In these embodiments, peaks of the crown portions 48 of the teeth 24 in the lower and upper archform images 44, 46 are identified as the contact regions 42.

In certain other embodiments, the contact regions 42 are determined by identifying an elevation of the crown portions 48 from a baseline, and determining those regions which have the highest elevation from the baseline according to a predetermined amount. The predetermined amount may be a predefined distance from the baseline. The predetermined amount may also be all those portions of the teeth which are at a predetermined percentage from the top of the total elevation from the baseline.

In certain other embodiments, the contact regions 42 are determined by identifying the lower teeth 24*a* in the lower archform image 44 or in the contact region model 54, and then applying typical known peaks for the identified teeth. The lower teeth 24*a* can be identified, for example, by conventional tooth or tooth group naming, e.g. molars, pre-molars, canines, incisors, front teeth; or by conventional tooth numbering, e.g. 32, 31, 30, 29, 28, 27, 26, 25, 24. Each tooth typically has a number of peaks, which are also known as "cusps". For example, molar teeth typically have four or five cusps. The cusps of the crown portions 48 of teeth can represent a good starting position of the contact region 42 for the purposes of identifying super contact regions 30.

Determining the Super Contact Region

As mentioned above, determining the super contact region 30 comprises identifying the area around the contact region 42 which exceeds a predetermined magnitude of contact between the upper teeth 24*b* and the lower teeth 24*a* during the predefined position of the upper and lower teeth 24*b*, 24*a*. In certain embodiments, determining the super contact region 30 comprises identifying and defining the area around the contact region 142 in terms of one or more of its boundary 32, configuration, shape, thickness, and the like. In certain embodiments, determining the super contact region 30 comprises defining a boundary 32 of the super contact region 30 about the at least one contact region 42.

In certain embodiments, the predetermined magnitude of contact comprises a force imparted by the contact of the upper teeth 24*b* and the lower teeth 24*a* during a predefined position or action of the upper teeth 24*b* and the lower teeth 24*a*. In certain situations, the predefined position of the upper teeth 24*b* and the lower teeth 24*a* is the natural "bite" of the upper teeth 24*b* and the lower teeth 24*a* of the subject. In other cases, the predefined position of the upper teeth 24*b* and the lower teeth 24*a* is a desired "bite" of the upper teeth 24*b* and the lower teeth 24*a* of the subject. In certain embodiments, the predefined action of the upper teeth 24*b* is a relative motion such as during a chewing action, a speaking action, or a biting action. These actions could be defined in terms of a desired action or a current action. In certain embodiments, the predefined position is a closed or resting position of a mouth of the subject. The predefined alignment position from Step 310 can be used here for the magnitude of contact determination.

The magnitude of contact, in certain embodiments, is determined from a distance of penetration of the opposing extended contact surfaces 58 of the contact region model 54 in the predefined position. It is to be noted that in embodiments where the predefined position is the resting "bite" configuration, this may possibly change depending on the treatment step of the subject. For the purposes of determining the magnitude of contact, the predefined position of the given treatment step is taken into account.

Figure 13:
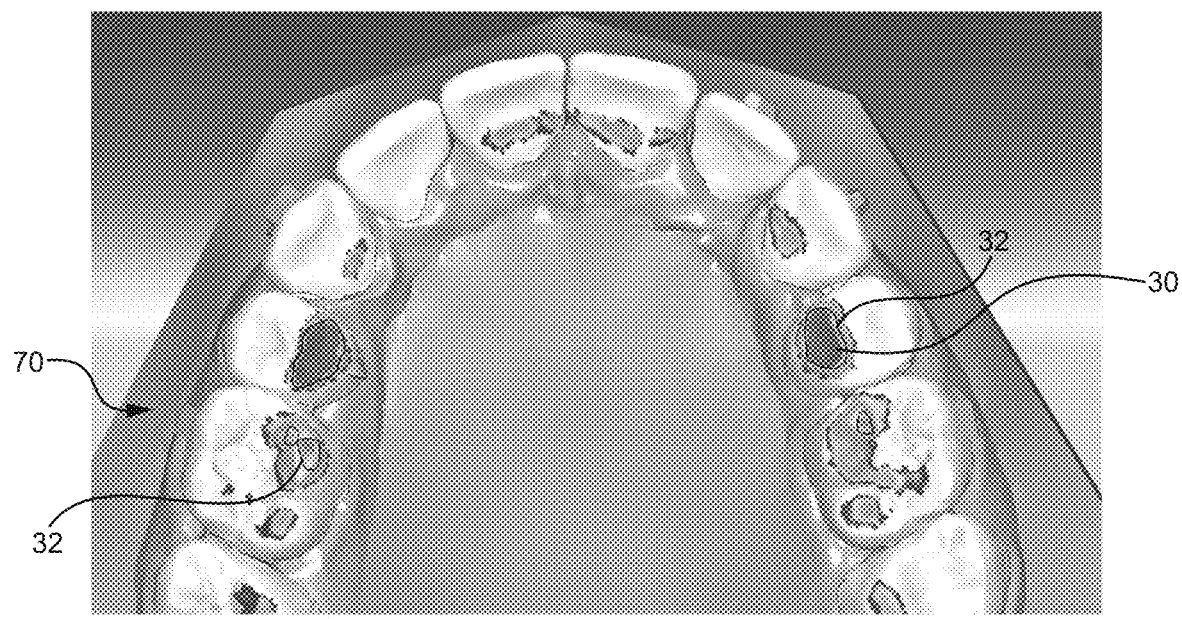
FIG. 13 illustrates the digital model of the upper archform of FIG. 8, and including defined boundaries of super contact regions, according to certain embodiments of the present technology.

In this respect, the predetermined magnitude of contact is mapped in order to identify the area with the predetermined magnitude of contact (FIGS. 12 and 13). By mapping is meant an identification of the intensity of the contact, in this case, the depth of penetration or overlap. The mapping can be represented visually as a type of heat map 70, for example. In this case, the method 300 can be said to comprise a step of generating a heat map 70 of the contact or occlusion between opposing extended contact surfaces 58 of the upper teeth 24*b* and the lower teeth 24*a* of the contact region model 54. The heat map 70 includes different intensities of contact or overlap. The boundary 32 of the super contact region 30 is identified by determining the area exceeding the predetermined magnitude of contact (e.g. the depth of penetration, the overlap, the force, etc.) as a locus within the map 70.

FIG. 12 shows one embodiment of such a determined heat map 70. In FIG. 12, the heat map 70 comprising the extents of the depth of penetration of the opposing extended contact surfaces 58 during the predefined position is illustrated. The more central, red areas, of the heat map 70 represent a higher magnitude of contact between the upper teeth 24*b* and the lower teeth 24*a* in terms of a depth of penetration of the opposing extended contact surfaces 58. In this embodiment, the predetermined magnitude of contact which is used to determine the boundary 32 of the super contact region 30 is the yellow/red magnitude. Depths of penetration exceeding the depth illustrated by the yellow portions in the heat map 70, will comprise the super contact region 30. FIG. 13 illustrates the identification of the boundary 32 of the super contact region 30.

In certain embodiments, the super contact region 30 is determined by taking the contact regions 42, and for each contact region 42 determining a contour around the contact region 42. The contour is determined, in certain embodiments, by measuring the geometric distances and then finding the boundaries around the iso-curves where the distance field crosses a given threshold. The iso-curve threshold will depend on the thickness of the aligner 10.

In certain other embodiments, the predetermined magnitude of contact, is a force imparted by the contact of the upper teeth 24*b* and the lower teeth 24*a* during the predefined position of the upper teeth 24*b* and the lower teeth 24*a*. This can be determined through modeling the forces imparted by the contact of the upper teeth 24*b* and lower teeth 24*a*. Alternatively, the forces imparted by the contact of the upper teeth 24*b* and lower teeth 24*a* during the predefined position or action can be measured.

In certain other embodiments, the predetermined magnitude of contact is an extent of compression of a predefined material applied between one or both of the upper teeth 24*b* and the lower teeth 24*a* during a predefined position or action of the upper teeth 24*b* and the lower teeth 24*a*. In this case, the predefined material can be that of an aligner 10 such as a digital model of the pre-form aligner.

Other parameters defining magnitude of contact are also possible such as deformation properties of the predefined aligner material, and the like.

In certain other embodiments, the super contact region is determined directly from images or models of the upper archform image 14 and the lower archform 12. In these embodiments, any suitable method can be used to measure or determine the super contact regions 30. For example, in certain embodiments, the super contact region 30 is measured from a physical model of the lower and upper archforms 12, 14 by an assessment of one or more of pressure between opposing teeth 24, geometry of opposing teeth, configuration of opposing teeth, height of opposing teeth, and any other measurable parameter. This assessment can be performed by aligning the upper and lower archforms 14, 12 in one or more positions representative of a bite position of the subject, a closed mouth position of the subject, or any other position or combination of positions.

In certain other embodiments, the super contact region 30 is measured from the actual lower and upper archforms 12, 14 of the subject, such as by an assessment of one or more of pressure between the opposing teeth 24, geometry of opposing teeth, configuration of opposing teeth, height of opposing teeth, and any other measurable parameter. This assessment can be performed by using a pressure sensitive material between opposing teeth of the subject for example, which would provide the heat map 70 of the contact pressure.

In certain embodiments, the contact region model 54 is defined as a two-dimensional data array that represents a vertical height of portions of a given tooth from a baseline ("height map"), or distances of portions of a given tooth from the baseline ("distance field"). The baseline can be an occlusal plane of the subject, such as a biting surface (occlusal plane) of one or more of the teeth 24. The super contact regions 30 between opposing teeth in the contact region model 54 can be determined as described above, or using distance or height fields. For example, the two-dimensional data array of the height map comprises x and y coordinates, where the x-y plane is the occlusal plane, and z coordinates representing the height of the crown portion of the tooth beyond the occlusal plane. Height maps can be used for posterior teeth, and distance fields for anterior teeth.

STEP 320: Generating a Digital Model of the Orthodontic Aligner for Making the Orthodontic Aligner, the Generating the Digital Model of the Orthodontic Aligner Comprising Applying the Determined Super Contact Region to a Digital Model of a Pre-Form Aligner Such that a Thickness of the Aligner Body at the Determined at Least One Super Contact Region is Less than a Thickness of the Aligner Body at Regions which are not Determined Super Contact Regions Referring back to FIG. 7A, the method 300 continues with Step 320 in which a digital model of the aligner 72 is generated based on the determined super contact zone 30. The determined boundary 32 of the super contact region 30 is applied to the digital model of the pre-form aligner 74 as a cut-out or as an opening in the aligner body 16.

The digital model of the pre-form aligner 74 includes a representation of features of the aligner 10 that include the orthodontic treatment to be applied. Those features include the size, shape and configuration of the inner surface 20 of the aligner 10 which are designed to impart a force to the teeth 24. The digital model of the pre-form aligner 74 can be obtained in any suitable manner. For example, the computer system 110 can be arranged to generate the digital model of the pre-form aligner 74 based on the desired treatment of the given orthodontic treatment. For example, the desired treatment may be determined according to the method and system described in U.S. Ser. No. 16/132,995, the contents of which are herein incorporated by reference. In certain other embodiments, the digital model of the pre-form aligner 74 may have been obtained in any other suitable manner and obtained by the computer system 110.

Determining Profile of Edge of Channel of Aligner

The method 300 also includes, in certain embodiments, a step of determining a profile of the edge of the channel 26 of the aligner 10, which in certain embodiments tracks the gum line 52 of the subject. In other embodiments, the profile of the edge of the channel 26 of the aligner 10 may be determined elsewhere and obtained by the computer system 110. In certain embodiments, the method 300 further comprises applying the profile of the edge of the channel 26 to the digital model of the aligner 72.

In certain embodiments, Developers have observed that providing the edge of the channel 26 with a profile which tracks or conforms to a profile of the gum line 52 of the subject can provide a more comfortable user experience to the subject. However, in order to incorporate such a profile in the digital model of the aligner 72, it is first necessary to identify the gum line 52 of the subject from images or digital models of the upper and/or lower archforms 12, 14.

In certain embodiments, determining the profile of the edge of the channel 26 comprises identifying the gum line 52 by parsing the image of one or both of the lower archform 12 and the upper archform 14. In certain other embodiments, instead of parsing the image, the method 300 comprises parsing the digital model of the pre-form aligner 74 to identify the gum line 52.

Figure 14:
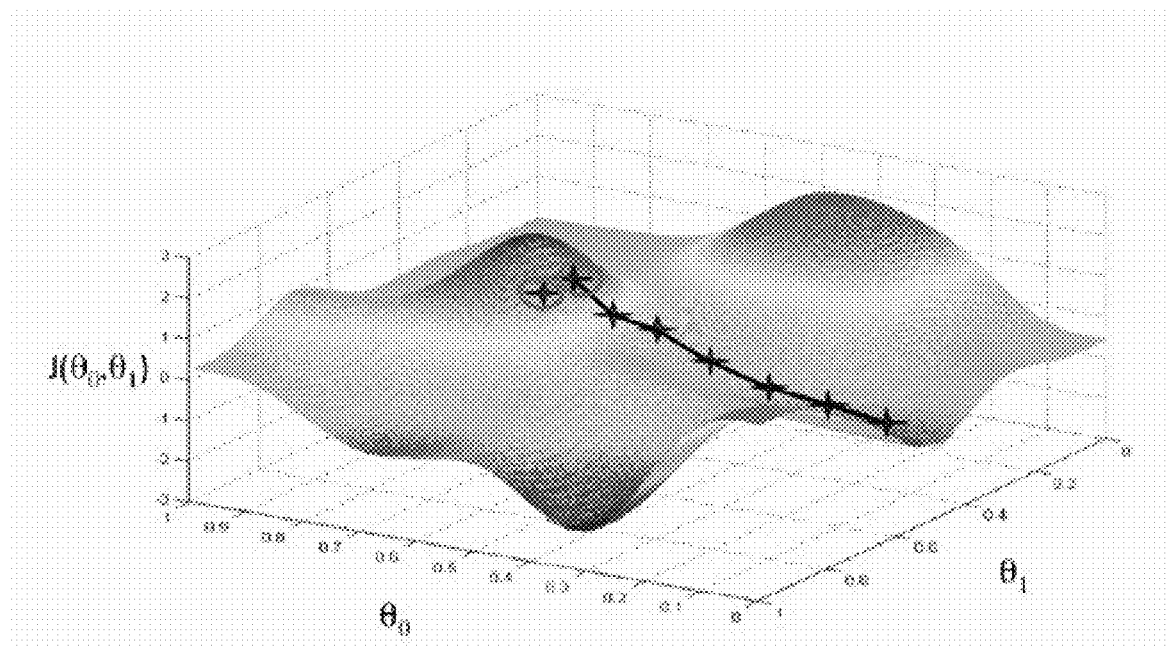
FIG. 14 illustrates a determination of surface curvature of the digital model of the upper archform of FIG. 8, according to certain embodiments of the present technology.
Figure 15:
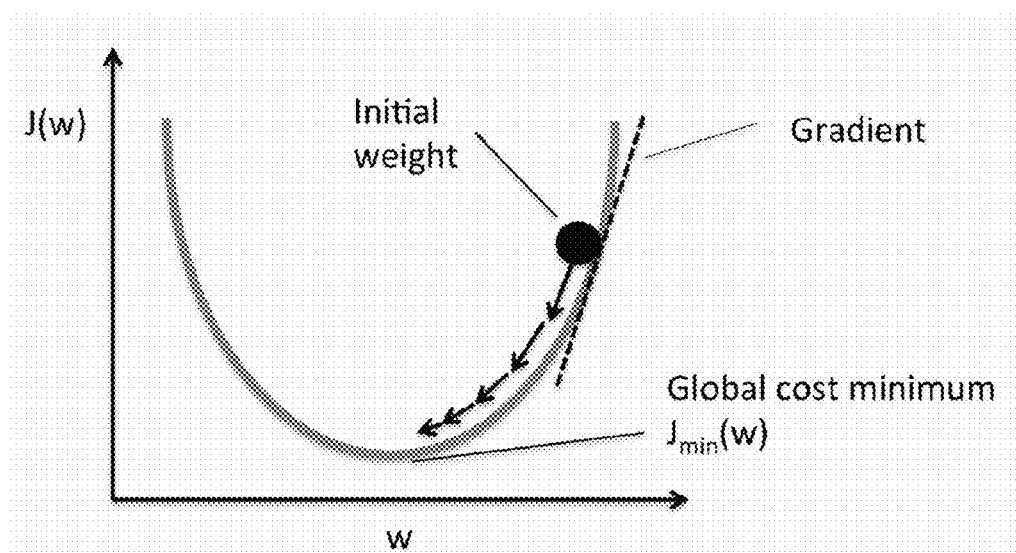
FIG. 15 illustrates a determination of a change in the surface curvature of the digital model of the upper archform of FIG. 8, according to certain embodiments of the present technology.
Figure 16:
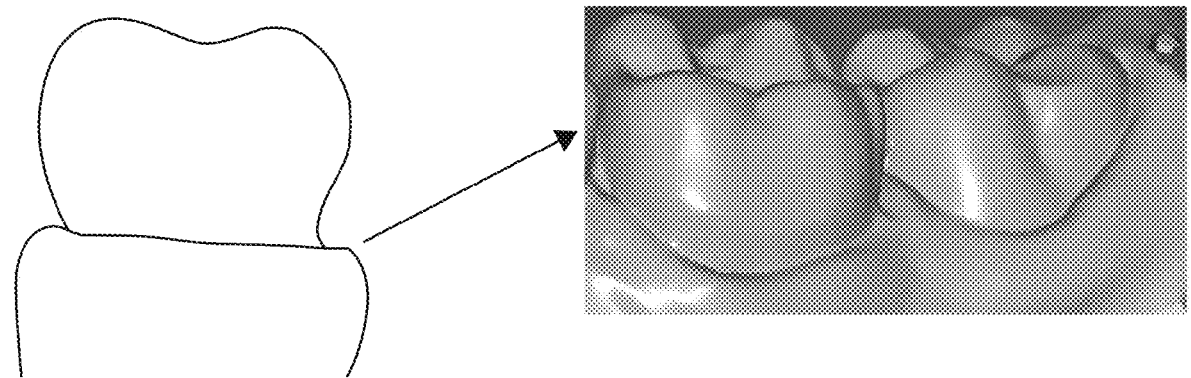
FIG. 16 illustrates a determination of a gum line by a change in the surface curvature of the digital model of the upper archform of FIG. 8, according to certain embodiments of the present technology.
Figure 17:
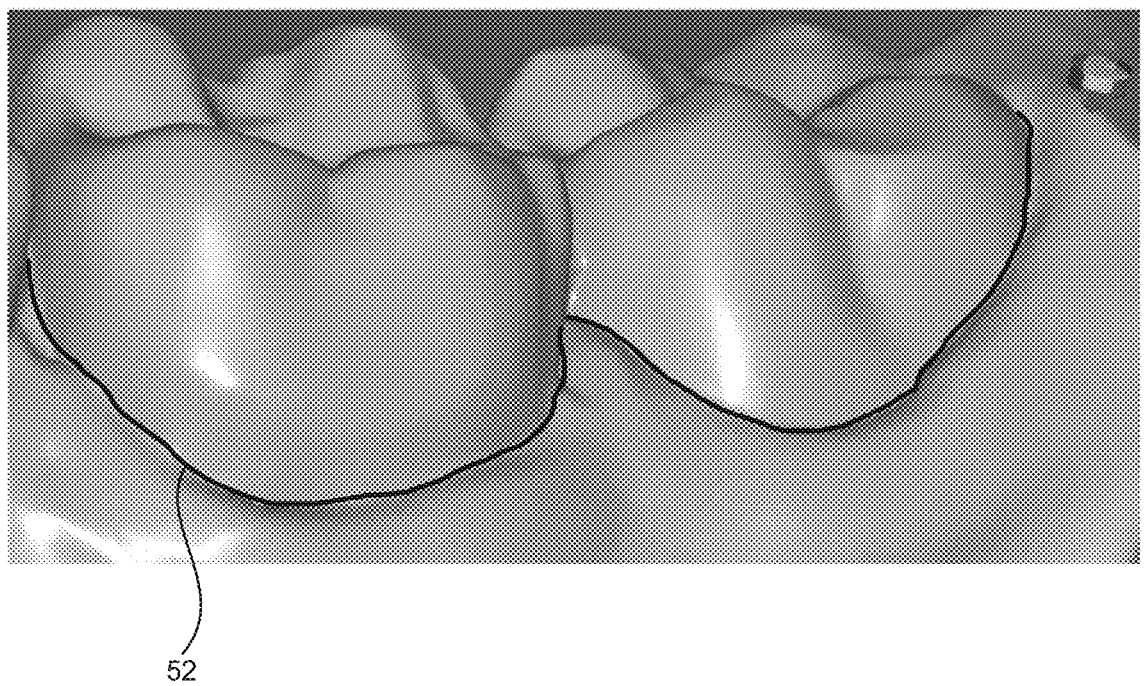
FIG. 17 illustrates the digital model of the upper archform of FIG. 8 with an identification of the determined gum line, according to certain embodiments of the present technology.

In certain embodiments, the parsing comprises determining the curvature of the surface of the crown portion 48 of the image or digital model. The curvature can be determined in any suitable manner such as using the Laplace method (FIG. 14), followed by determining a change in the curvature such as through an active contour algorithm (FIG. 15). In this way, the gum line 52 is determined to be along the area of maximum depression or change in curvature (FIGS. 16 and 17).

Figure 18:
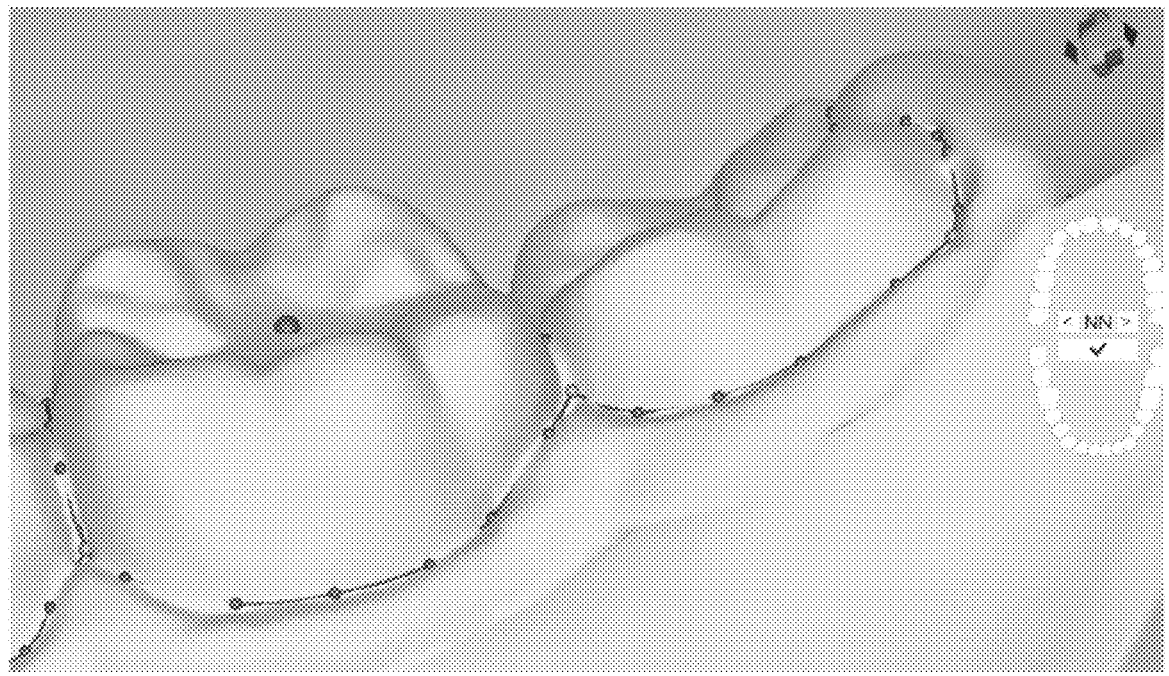
FIG. 18 illustrates the digital model of the upper archform of FIG. 8 with an identification of a segmentation step, according to certain embodiments of the present technology.
Figure 19:
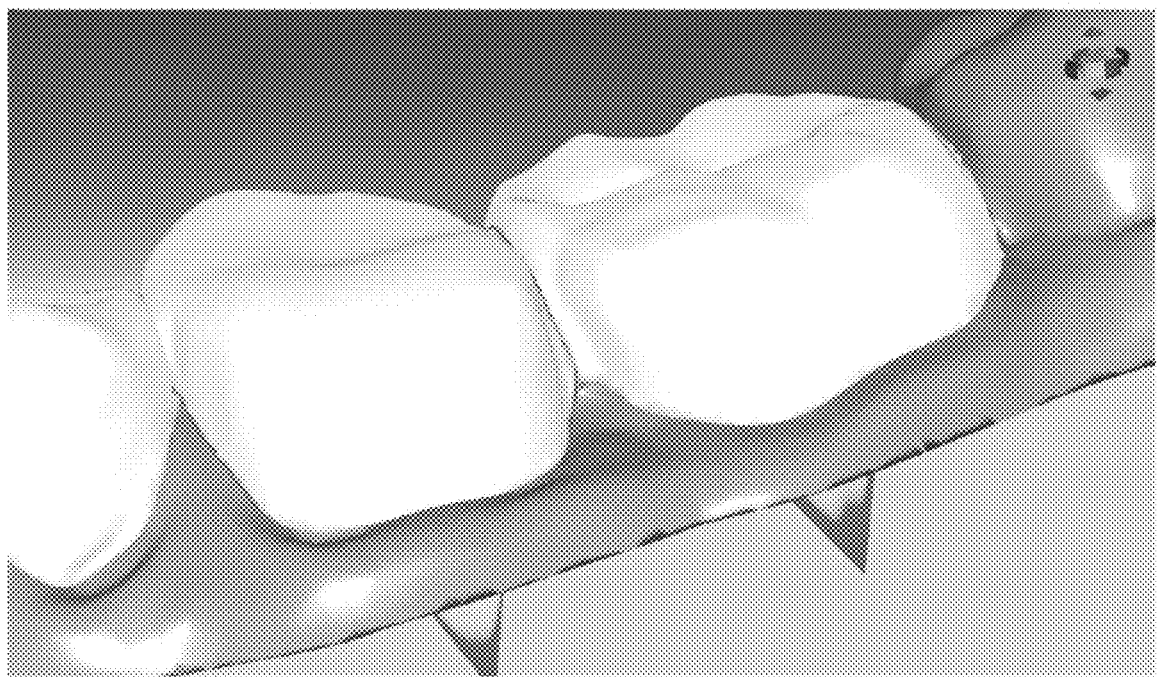
FIG. 19 illustrates the digital image of the upper archform of FIG. 8 with the identified gum portion partially removed, according to certain embodiments of the present technology.
Figure 20:
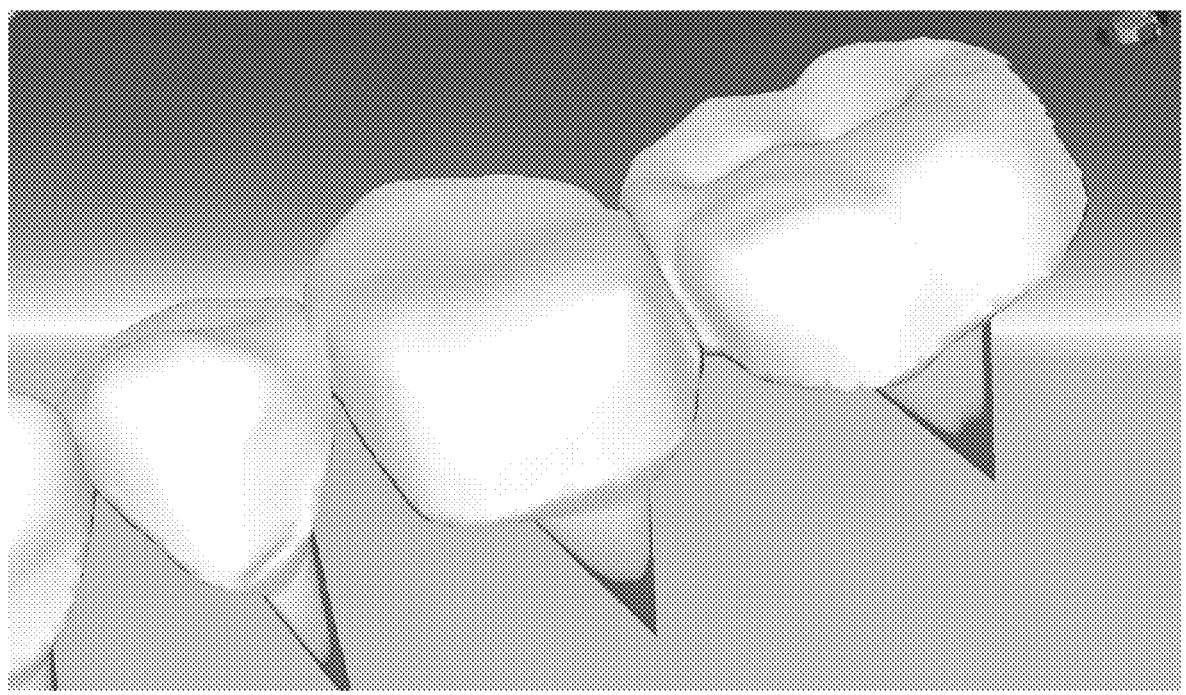
FIG. 20 illustrates the digital image of the upper archform of FIG. 8 with the identified gum portion fully removed, according to certain embodiments of the present technology.

The method 300 continues, in certain embodiments, with image processing steps to separate the crown portion 48 from the gums using the determined gum line 52 (FIGS. 18 and 19) and then to remove the gum portion from the digital model (FIG. 19). This is also known as a segmentation step.

In certain embodiments, the method 300 further comprises re-building a gum portion in the digital model of the aligner 72, in the digital model of the pre-form aligner 74, or in a digital model of the physical mould on which the pre-form aligner will be based (e.g. by thermoforming).

Figure 23:
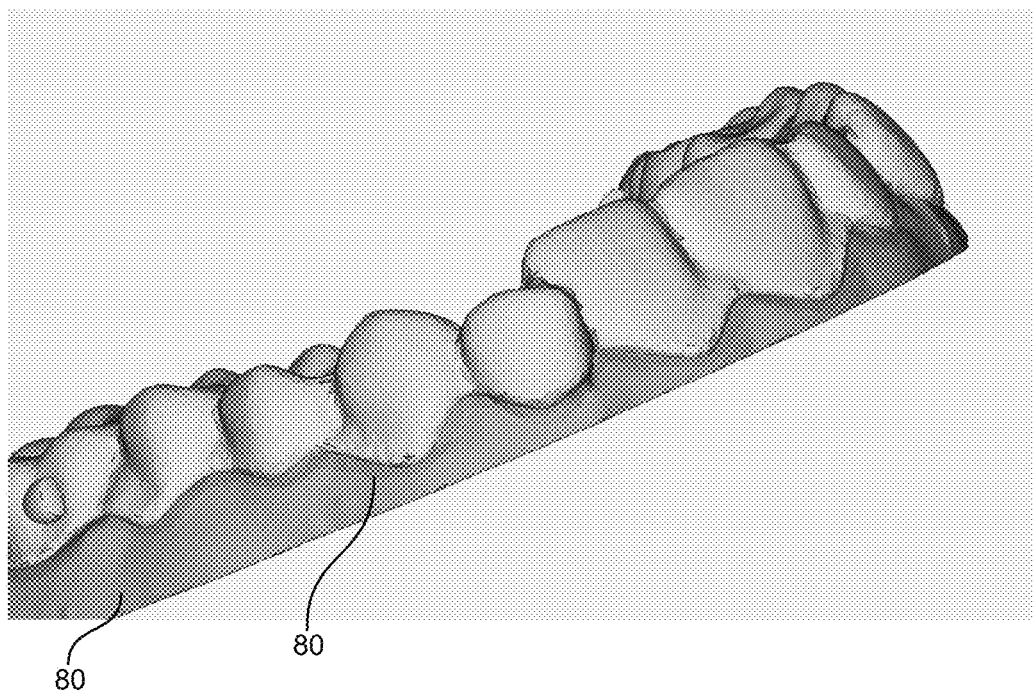
FIG. 23 illustrates the digital model of the pre-form aligner of FIG. 22 showing a determined gum line, according to certain embodiments of the present technology.

One or more of predetermined templates, the determined boundary 32 of the super contact region 30 and the determined gum line 52 are applied to one or more of these digital models using any suitable technique. In certain embodiments, an adaptive smoothing method is used to apply a new gum portion 80 to the digital model. Adaptive areas are projected onto the correct position on the digital model. In certain embodiments, the tooth numbering performed earlier in the method 300 is used. A certain area of the template is moved with the adaptive area and the surface thus created between the tooth 24 and the adaptive area is smoothed. FIG. 23 illustrates the digital model of the pre-form aligner 74 including the new gum portion 80 extending from the determined gum line 52.

The method 300 includes adaptive smoothing in embodiments in which consecutive digital models of the aligners 72 are generated for administering consecutive treatment steps. In this respect, the method 300 comprises repeating any of the above-described steps of the method 300 for each treatment step of the consecutive treatment steps. As the teeth 24 are being moved move from one treatment step to another, adaptation of the gum needs to follow.

In practice, in certain embodiments, the pre-form aligner, which is typically thermoformed on the physical mould, requires trimming along the gum line 76. The gum portion of the aligner 10 is thus pre-generated on a digital model of the physical mould on which the pre-form aligner is made. The physical mould can be considered as a physical template for the pre-form aligner. These gum regions are required to be part of the mould as the edge of the channel 26 of the pre-form aligner 10 overhangs the teeth of the physical mould and thus overlaps some of the gum regions, which means these regions are required to be part of the physical mould, and hence the digital model of the physical mould, for the purposes of thermoforming the pre-form aligner. In certain other embodiments where the aligner 10 is made directly from the digital model of the aligner 72 by 3D printing, the pre-form aligner nor the gum regions may be required.

Once the digital model of the aligner 72 is determined, the method 300 may include steps of sending instructions to the manufacturing apparatus 130, such as the laser apparatus 132, to make the orthodontic aligner 10 according to the determined digital model of the aligner 72. In certain embodiments, the instructions comprise instructions for applying a cut-out or thinned material to the pre-form aligner at the determined super contact region 30 and having the determined boundary 32.

In certain embodiments, the method 300 comprises sending instructions, by the processor 150, to the laser apparatus 132 for removing material from a pre-form aligner at the determined at least one super contact region 30.

The instructions comprise instructions for cutting the pre-form aligner along one or both of: the determined boundary 32 of the determined super contact region 30 according to the determined digital model of the aligner 72; and a determined profile of the edge of the channel 26 according to the determined digital model of the aligner 72.

In other embodiments, the method 300 comprises sending instructions, by the processor 150, to the aligner manufacturing system 136 to make the aligner 10 according to the determined digital model of the aligner 72.

The orthodontic aligner 10 thus obtained from the determined digital model 72 and made in any convenient manner, comprises least one super contact region 30, a thickness of the aligner body 16 at the at least one super contact region 30 being less than a thickness of the aligner body 16 in areas which are not super contact regions, wherein the super contact region 30 is defined by an area of contact between the upper teeth 24b and the lower teeth 24a which exceeds a predetermined magnitude of contact between the upper teeth 24b and the lower teeth 24a during a predefined position of the upper teeth 24b and the lower teeth 24a of the subject. In certain embodiments, the super contact region 30 is an opening defined in the aligner body 16 of the orthodontic aligner 10. In certain embodiments, the edge of the channel 26 has a profile that tracks the gum line 52 of the subject.

In certain embodiments, the method 300 of making the aligner 10 includes additional steps for determining an orthodontic treatment using the aligner 10 of the present technology.

For example, the method 300 may comprise steps for determining an orthodontic treatment having a number of sequential treatment steps with the aligner 10, the sequential treatment steps defining treatment intervals therebetween, the method executable by a processor of a computer system (such as the processor 150 of the computer system 110), the method 300 comprising: obtaining a segmented 3D model of a plurality of teeth 24 of the subject, the segmented 3D model of each tooth of the plurality of teeth 24 including at least crown portion data; obtaining a start position and a desired end position of each tooth of the plurality of teeth; determining an initial number of sequential treatment steps to move each tooth of the plurality of teeth from the start position to the desired end position, the initial number of sequential treatment steps being based on an initial distance of each treatment interval; for each tooth of the plurality of teeth, and for each treatment interval, determining a root force imposed on a root portion of the given tooth by the given aligner; and selectively executing: in response to the root force of each tooth of the plurality of teeth not exceeding a predetermined threshold value, determining that the determined initial number of sequential treatment steps is the determined orthodontic treatment; and in response to the root force, for any one of the teeth of the plurality of teeth, exceeding the predetermined threshold value, iteratively decreasing the initial distance of each treatment interval to provide a revised number of sequential treatment steps, and for each one of the determined revised number of sequential treatment steps re-calculating the root force imposed on the root portion of each tooth by the given aligner, until it is determined that the root force, of each tooth of the plurality of teeth, does not exceed the predetermined threshold value.

In certain embodiments, the determining the root force imposed on the root portion of the given tooth 24 by the given aligner 10 includes taking into account the reduced thickness of the aligner 10 at the super contact regions 30.

In certain embodiments, determining the root force imposed on the root portion of the given tooth in the given treatment interval comprises: simulating movement of the given tooth within the given treatment interval, based on simulation of the movement of the given tooth from the start position to the desired end position based on the segmented 3D model of the plurality of teeth; determining an impact force of the given orthodontic aligner used during the given treatment interval on the given tooth, based on the simulated movement of the given tooth within the given treatment interval; and determining the root force imposed on the root portion of the given tooth, based on the determined impact force and an anatomical consideration of the root portion of the given tooth.

In certain embodiments, the re-calculating the root force imposed on the root portion of each tooth by the given orthodontic aligner comprises: determining a revised impact force of the given orthodontic aligner used during the given treatment interval on the given tooth, based on the simulated movement of the given tooth within the given treatment interval; and determining a revised root force imposed on the root portion of the given tooth, based on the revised impact force and the anatomical consideration of the root portion of the given tooth.

In certain embodiments, the anatomical consideration of the root portion of the given tooth comprises root portion data including one or more of: a geometry of the root portion, an indication of a length of the root portion, crown portion topography, root portion topography, root portion surface area, and type of tooth.

In certain embodiments, the method 300 further comprises obtaining the root portion data by obtaining CT scan data of the plurality of teeth, segmenting the CT scan data to separate the individual teeth, and parsing the CT scan data to separate crown portion data from root portion data.

In certain embodiments, the obtaining the segmented 3D model of the plurality of teeth comprises: obtaining 3D optical image data of the plurality of teeth, and digitally separating each tooth of the plurality of teeth in the 3D optical image data to obtain the segmented 3D image data of the plurality of teeth.

In certain embodiments, the impact force of the given orthodontic aligner is determined based on Finite Element Method (FEM) modelling.

In certain embodiments, the FEM modelling comprises imposing boundary conditions which reflect the interaction (or deformation) of an orthodontic aligner with the teeth, caused by contact of the teeth with the aligner, during a simulation of the movement of the teeth from the start position to the desired end position.

In certain embodiments, the impact force of the given aligner is based on one or more of: material property, configuration, and method of manufacture.

In certain embodiments, the root force comprises an average force imposed on periodontal ligaments around an entirety of the given tooth root portion.

In certain embodiments, the decreasing the initial distance comprises decreasing the initial distance by an amount proportional to an excess amount of the determined root force above the predetermined threshold.

In certain embodiments, the method further comprises determining intermediate collisions between adjacent teeth in the plurality of teeth for each treatment interval between each sequential treatment step of the initial number of sequential steps, the determining intermediate collisions being based on the determined simulated movement of each tooth.

In certain embodiments, the method further comprises displaying the determined intermediate collisions on a screen connected to the computer system, or sending instructions to display the intermediate collisions on a screen.

In certain embodiments, the method 300 further comprises one or both of: displaying the determined orthodontic treatment on a screen connected to the computer system; and sending production instructions to the manufacturing apparatus 130 to generate the aligner 10 according to the determined orthodontic treatment.

In certain embodiments, the obtaining a start position and a desired end position of each tooth of the plurality of teeth comprises defining the start position and the desired end position of each tooth as an x, y, z coordinate. In certain embodiments, the initial distance is about 200 microns.

The method of determination of orthodontic treatment is further described in U.S. Ser. No. 16/132,995, the contents of which are hereby incorporated by reference.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. For example, the manufacturing of the ligner 10 is also considered to include adapting an existing aligner to include the super contact regions 30 and/or the gum line. The scope of the present technology is therefore intended to be limited solely by the scope of the appended claims.

The invention claimed is:

1. A method for making an orthodontic aligner comprising an aligner body defining a channel for receiving teeth of a lower archform or an upper archform of a subject, the method being implemented by a processor of a computer system, the method comprising:
    obtaining an image of the upper archform and the lower archform of a subject's teeth, the image comprising a three-dimensional representation of one or more of the upper teeth of the subject and the lower teeth of the subject;
    generating a contact region model of the upper teeth and the lower teeth;
    identifying a contact surface on at least one or both of the upper teeth and the lower teeth in the contact region model;
    determining an extended contact surface on the at least one or both of the upper teeth and the lower teeth in the contact region model, the extended contact surface being spaced from the contact surface by a predetermined distance;
    determining as at least one contact region, when the upper teeth and the lower teeth of the contact region model are aligned in a predefined bite configuration, those areas which hinder the predefined bite configuration of the upper and lower teeth, based on:
        opposing extended contact surfaces of the upper teeth and the lower teeth of the contact region model, or
        the extended contact surface of one of the upper teeth and the lower teeth of the contact region model, and the contact surface of the other of the upper teeth and the lower teeth of the contact region model;
    determining, by the processor, at least one super contact region between upper teeth and lower teeth of a subject, the determining the at least one super contact region comprising identifying an area around the at least one contact region between the upper teeth and the lower teeth which exceeds a predetermined magnitude of contact between the upper teeth and the lower teeth during a predefined position of the upper teeth and the lower teeth of the subject, wherein the predetermined magnitude of contact comprises a depth of overlap between opposing extended contact surfaces of the upper teeth and the lower teeth in the contact region model; and
    generating a digital model of the orthodontic aligner for making the orthodontic aligner, the generating the digital model of the orthodontic aligner comprising applying the determined super contact region to a digital model of a pre-form aligner such that a thickness of the aligner body at the determined at least one super contact region is less than a thickness of the aligner body at regions which are not determined super contact regions.

2. The method of claim 1, wherein determining the at least one super contact region comprises defining a boundary of the super contact region about the at least one contact region.

3. The method of claim 1, wherein the determining the at least one super contact region comprises mapping the contact between the upper teeth and the lower teeth during a predefined position of the upper teeth and the lower teeth of the subject, before identifying the area which exceeds the predetermined magnitude of contact within the mapped extent of the contact.

4. The method of claim 1, wherein the determined super contact region is applied as a cut-out or a thinned portion to the digital model of the pre-form aligner, the digital model of the pre-form aligner.

5. The method of claim 1, wherein the digital model of the orthodontic aligner includes a profile of an edge of the channel of the aligner, the method further comprising determining the profile of the edge of the channel such that the determined profile of the edge of the channel tracks a gum line of the subject.

6. The method of claim 5, wherein the determining the profile of the edge of the channel comprises parsing the image of one or both of:
    the lower archform, and
    the upper archform,
to identify the profile of the gum line of the subject.

7. The method of claim 6, wherein the profile of the gum line is determined based on a determination of a curvature of the surface of a crown portion, and applying an active contour modelling.

8. The method of claim 7, further comprising parsing the image of one or more of the upper archform and the lower archform to separate the crown portion from the gums according to the determined gum line, and creating a new digital model of gums based on adaptive regions in the template.

9. The method of claim 1, further comprising one of:
    (i) sending instructions to a manufacturing apparatus to make the orthodontic aligner according to the digital model of the orthodontic aligner, wherein the instructions comprise instructions for applying a cut-out or thinned material to a pre-form aligner at the determined super contact region; and
    (ii) sending instructions to a manufacturing apparatus to make the orthodontic aligner according to the digital model of the orthodontic aligner, wherein the instructions comprise instructions for forming the aligner including cut-outs or thinned portions at the determined super contact region.

10. The method of claim 9, wherein the instructions comprise instructions for cutting a pre-form aligner along one or both of:
- a determined boundary of the determined super contact region according to the determined digital model of the orthodontic aligner; and
- a determined profile of the edge of the channel according to the determined digital model of the orthodontic aligner.

11. A system for making an orthodontic aligner comprising an aligner body defining a channel for receiving teeth of a lower archform or an upper archform of a subject, the system comprising:
- a computer system having a processor for executing a method for making an orthodontic aligner according to a determined digital model; and
- a manufacturing apparatus operatively connectable with the processor and arranged to make the aligner according to the determined digital model, the method comprising:
    - obtaining an image of the upper archform and the lower archform of a subject's teeth, the image comprising a three-dimensional representation of one or more of the upper teeth of the subject and the lower teeth of the subject;
    - generating a contact region model of the upper teeth and the lower teeth;
    - identifying a contact surface on at least one or both of the upper teeth and the lower teeth in the contact region model;
    - determining an extended contact surface on the at least one or both of the upper teeth and the lower teeth in the contact region model, the extended contact surface being spaced from the contact surface by a predetermined distance;
    - determining as at least one contact region, when the upper teeth and the lower teeth of the contact region model are aligned in a predefined bite configuration, those areas which hinder the predefined bite configuration of the upper and lower teeth, based on:
        - opposing extended contact surfaces of the upper teeth and the lower teeth of the contact region model, or
        - the extended contact surface of one of the upper teeth and the lower teeth of the contact region model, and the contact surface of the other of the upper teeth and the lower teeth of the contact region model;
    - determining, by the processor, at least one super contact region between upper teeth and lower teeth of a subject, the determining the at least one super contact region comprising identifying an area around the at least one contact region between the upper teeth and the lower teeth which exceeds a predetermined magnitude of contact between the upper teeth and the lower teeth during a predefined position of the upper teeth and the lower teeth of the subject, wherein the predetermined magnitude of contact comprises a depth of overlap between opposing extended contact surfaces of the upper teeth and the lower teeth in the contact region model; and
    - generating the digital model of the orthodontic aligner for making the orthodontic aligner by applying the determined super contact region to a digital model of a pre-form aligner such that a thickness of the aligner body at the determined at least one super contact region is less than a thickness of the aligner body at regions which are not determined super contact regions.

12. The system of claim 11, wherein the manufacturing apparatus comprises a laser apparatus for cutting a pre-form orthodontic aligner along one or more of:
- a boundary of the determined super contact region, and
- a determined profile of the edge of the channel.

13. The system of claim 11, wherein the manufacturing apparatus comprises an apparatus for making the pre-form orthodontic aligner, or an apparatus for making a mould for making the pre-form orthodontic aligner.

* * * * *